March 30, 1926.

Re. 16,304

C. D. LAKE

PRINTING TABULATOR

Original Filed Dec. 29, 1919 19 Sheets-Sheet 1

March 30, 1926. Re. 16,304

C. D. LAKE

PRINTING TABULATOR

Original Filed Dec. 29, 1919 19 Sheets-Sheet 2

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 3

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 4

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 5

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 6

INVENTOR
Clair D. Lake

By Cooper, Kerr + Dunham
ATTORNEYS

March 30, 1926. Re. 16,304
C. D. LAKE
PRINTING TABULATOR
Original Filed Dec. 29, 1919 19 Sheets-Sheet 7
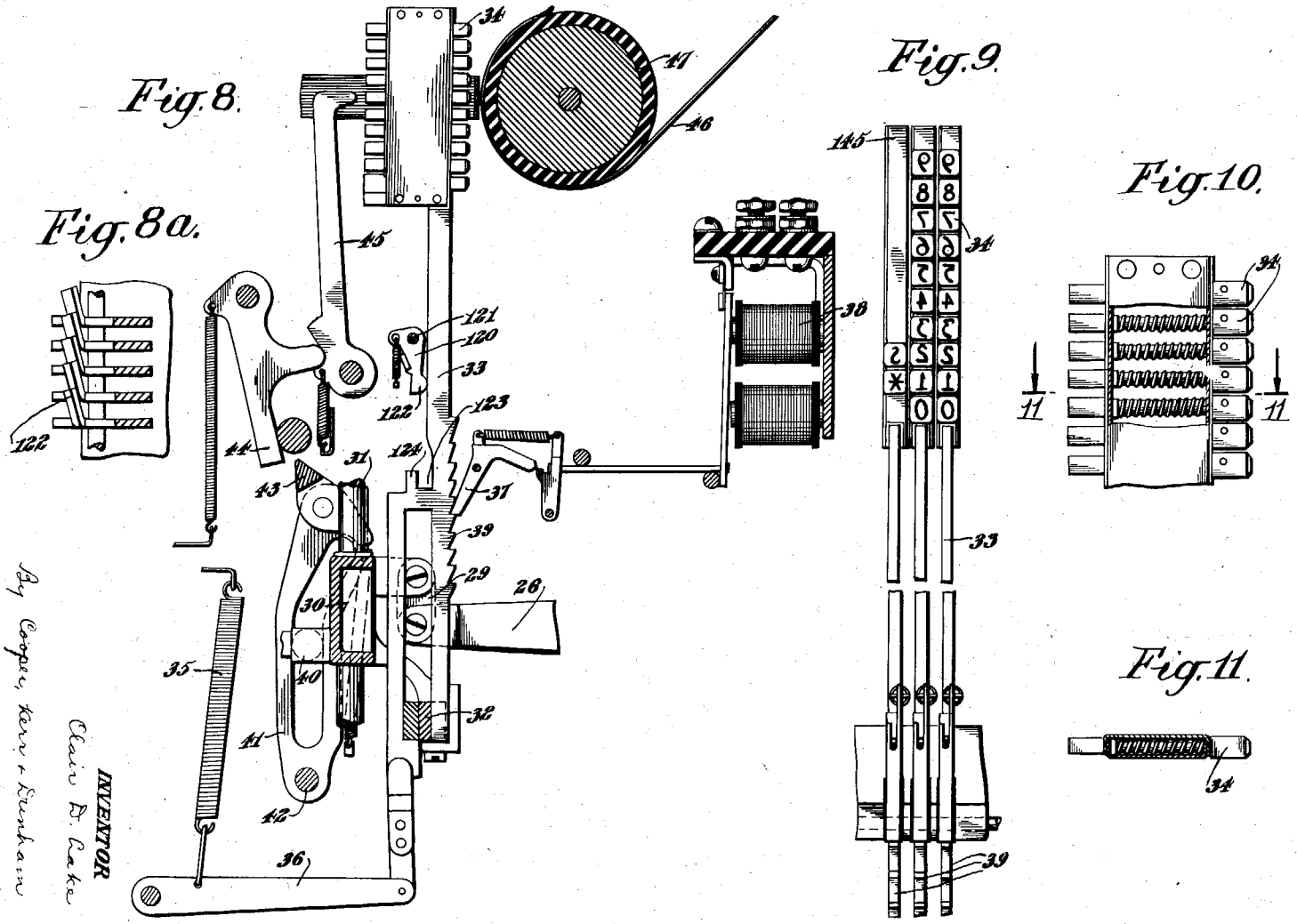
INVENTOR
Clair D. Lake
By Cooper, Kerr & Dunham
ATTORNEYS March 30, 1926. Re. 16,304

C. D. LAKE

PRINTING TABULATOR

Original Filed Dec. 29, 1919 19 Sheets-Sheet 8

INVENTOR
Clair D. Lake

By Cooper, Kerr & Dunham
ATTORNEYS

March 30, 1926. Re. 16,304

C. D. LAKE

PRINTING TABULATOR.

Original Filed Dec. 29, 1919 19 Sheets-Sheet 9

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 10

INVENTOR
Clair D. Lake
By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 11

INVENTOR
Clair D. Lake

By Cooper, Kerr + Dunham
ATTORNEYS

March 30, 1926. Re. 16,304

C. D. LAKE

PRINTING TABULATOR

Original Filed Dec. 29, 1919 19 Sheets-Sheet 12

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 13

INVENTOR
Clair D. Lake

By Cooper, Kerr & Dunham
ATTORNEYS

March 30, 1926. Re. 16,304
C. D. LAKE
PRINTING TABULATOR
Original Filed Dec. 29, 1919 19 Sheets-Sheet 14
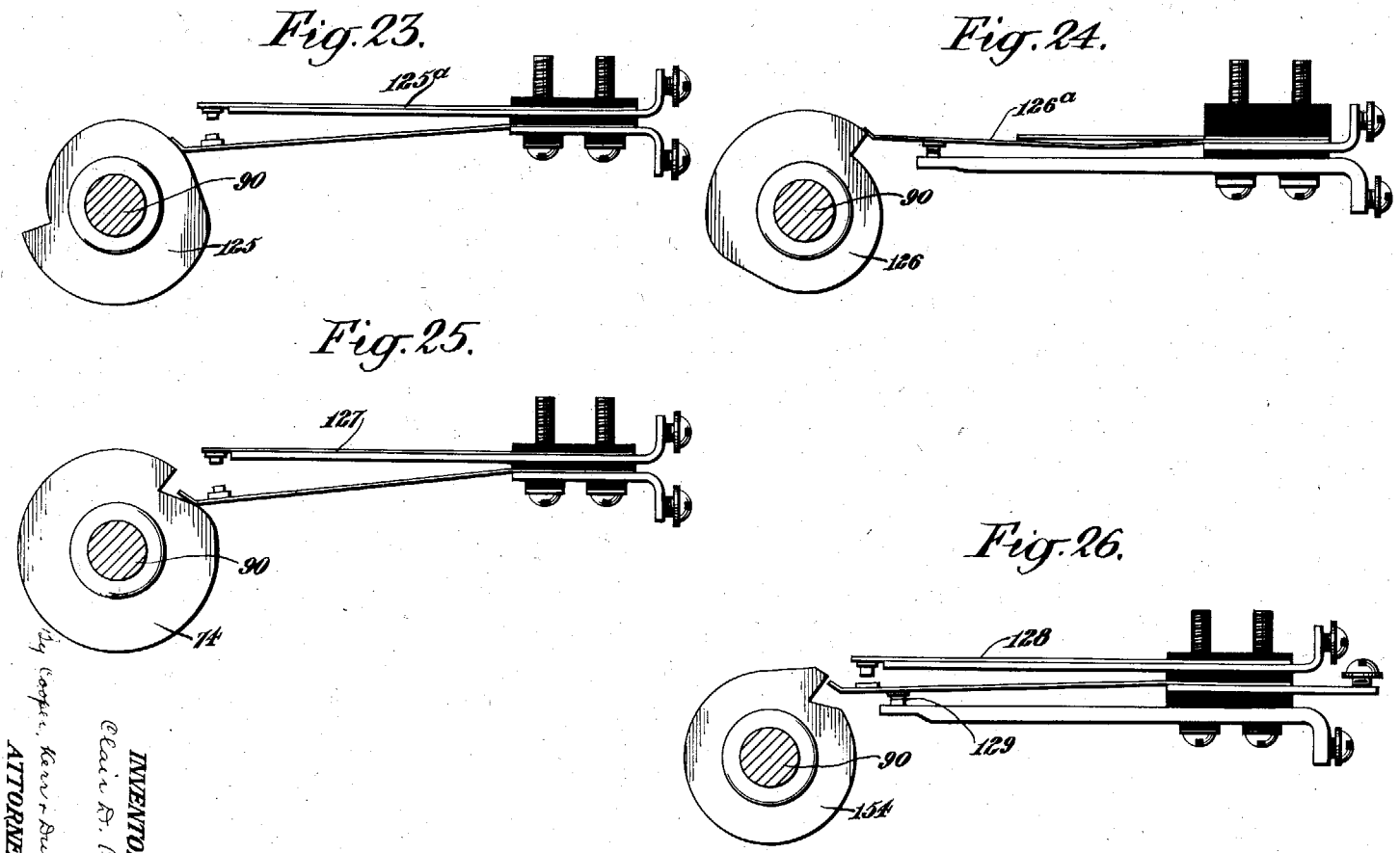
INVENTOR
Clair D. Lake
By Cooper, Kerr & Dunham
ATTORNEYS March 30, 1926. Re. 16,304

C. D. LAKE

PRINTING TABULATOR

Original Filed Dec. 29, 1919 19 Sheets-Sheet 15

INVENTOR
Clair D. Lake

By Cooper, Kerr & Dunham
ATTORNEYS

March 30, 1926. Re. 16,304
C. D. LAKE
PRINTING TABULATOR
Original Filed Dec. 29, 1919 19 Sheets-Sheet 16
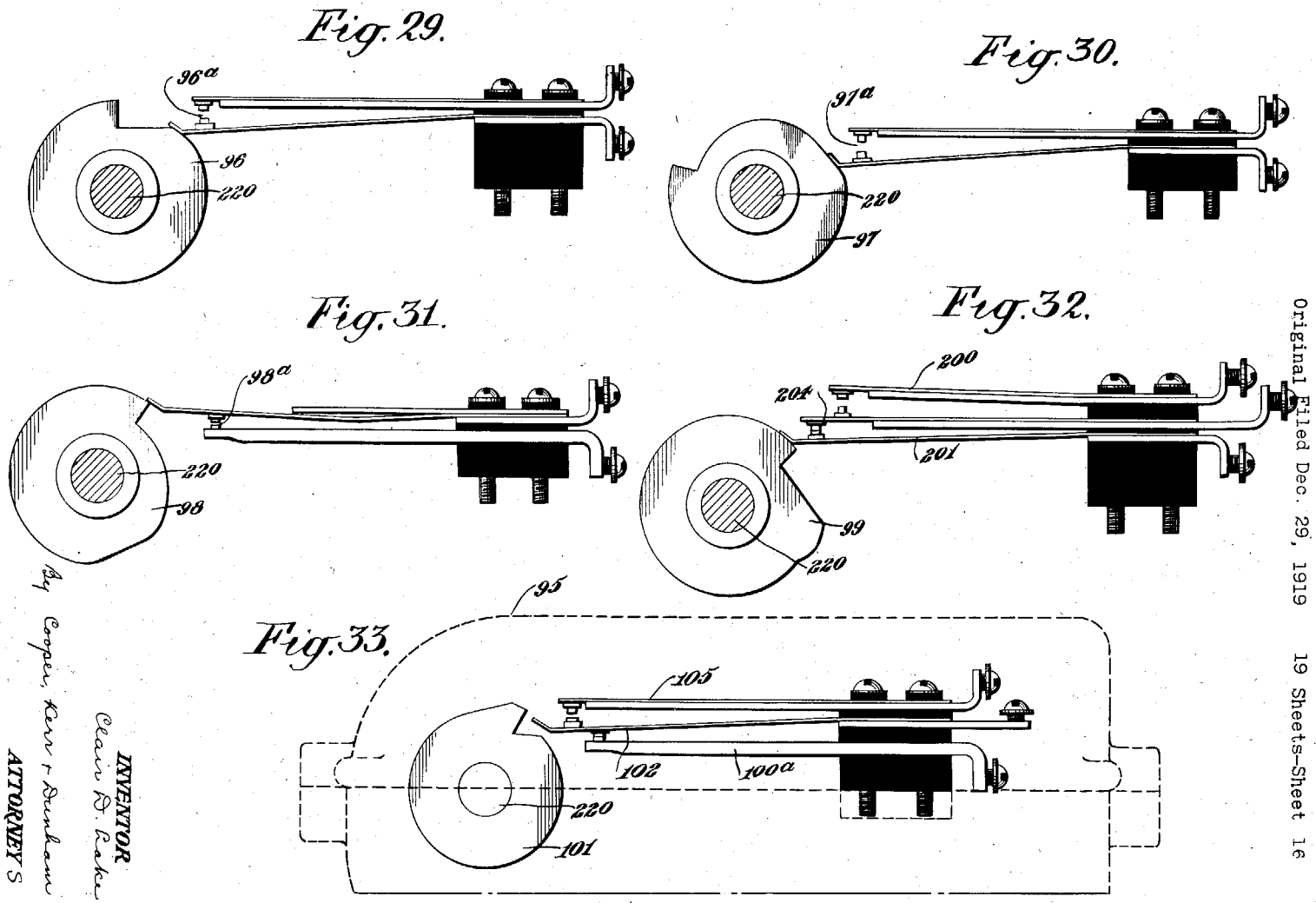
INVENTOR
Clair D. Lake
By Cooper, Kerr & Dunham
ATTORNEYS March 30, 1926. Re. 16,304

C. D. LAKE

PRINTING TABULATOR

Original Filed Dec. 29, 1919 19 Sheets-Sheet 17

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 18

INVENTOR
Clair D. Lake

By Cooper, Kerr & Dunham
ATTORNEYS

March 30, 1926. Re. 16,304

C. D. LAKE

PRINTING TABULATOR

Original Filed Dec. 29, 1919 19 Sheets-Sheet 19

INVENTOR
Clair D. Lake

By Cooper, Kerr & Dunham
ATTORNEYS

Reissued Mar. 30, 1926. Re. 16,304

UNITED STATES PATENT OFFICE.

CLAIR DENNISON LAKE, OF BINGHAMTON, NEW YORK, ASSIGNOR TO THE TABULATING MACHINE COMPANY, A CORPORATION OF NEW JERSEY.

PRINTING TABULATOR.

Original No. 1,379,268, dated May 24, 1921, Serial No. 348,069, filed December 29, 1919. Application for reissue filed December 3, 1921. Serial No. 519,780.

*To all whom it may concern:*

Be it known that I, CLAIR D. LAKE, a citizen of the United States, residing at Binghamton, in the county of Broome and State of New York, have invented certain new and useful Improvements in Printing Tabulators, of which the following is a full, clear, and exact description.

The invention which forms the subject of this application for Letters Patent is an improvement in attachments for tabulating machines, more particularly the well known and widely used Hollerith tabulator, which is typical of the general class of machines designed solely for tabulating.

This machine is set forth in numerous patents but is, perhaps, more fully shown and described in Patent No. 945,236, dated January 4, 1910.

In such machines provision is made for passing singly and in rapid succession a stack of perforated cards under a series of brushes or contacts which, encountering perforations, make contact with a conductor over which the cards pass, and thereby energize electromagnets to operate suitably designed and constructed means for indicating the data which the perforations by their number or location represent. Generally speaking, the main function of such machines is to totalize items and when a determined number of cards has been run through, the indicated totals may be read off and taken down. No provision, as a rule, is made for printing or permanently recording the individual items, as this requires more time, and a slower operation of the machine than its normal use will permit. Hence, to list the items indicated by a stack of cards, would involve the reading and recording of each figure displayed by the record wheels.

My purpose has been to extend the field of usefulness of such machines, and to provide means whereby they may be called upon, when occasion requires, to list or print the items and to print or record subtotals and totals, and in general to make a permanent record of whatever operation they may be called upon to perform. With this object in mind I have devised an attachment to a tabulator which will operate in synchronism or exact accord therewith to record each item, subtotal or grand total as the case may be, and to adapt the tabulator to listing I provide means for varying and controlling its speed whereby it must be run at a reduced speed when listing or may be run at its normal high speed when merely tabulating.

The accomplishment of this result has involved chiefly the devising of new mechanical and electrical devices, and combinations, and in these the invention resides. The general nature of the improvement may therefore be gathered from the consideration that in the tabulator proper there are a number of indicating wheels which are set to indicate the numbers corresponding to the perforations in the cards. My new attachment is capable of printing each number so indicated, or the totals of a group of such numbers, or the grand totals of several groups. It is provided with means for resetting the indicating wheels to zero after any or any number of operations, so that after resetting no totals may be preserved, or on the other hand, if not reset, a subtotal may be printed and preserved, so that the next printed total will be a grand total and so on.

As above stated, there is used a controlling device by which the speed of the tabulator is reduced when the attachment is used for listing, but if only totals are to be printed, then the machine may be set for the higher or normal tabulator speed, and the individual numbers are not printed, the totals being recorded automatically or by pressing a button, which causes the proper mechanism for the purpose to operate.

The improvement is illustrated in detail in the accompanying drawings:

Fig. 8 is an enlarged detail of the means for setting the printing type carriers and effecting the printing.

Fig. 8a is a detail of a zero control device, shown in Fig. 8.

Fig. 9 is a view in side elevation on an enlarged scale of the printing type carriers.

Fig. 10 is a detail of a portion of the type carrier.

Fig. 11 is a detail of a type on the line 11 of Fig. 10.

Figs. 23, 24, 25 and 26 are detail views of certain cams and contacts employed in the tabulator printer attachment.

Figs. 29, 30, 31, 32 and 33 are detail views of cams and contacts used in the tabulator.

Similar reference numerals in all of the above figures are employed to designate corresponding parts thereof.

Figure 1:
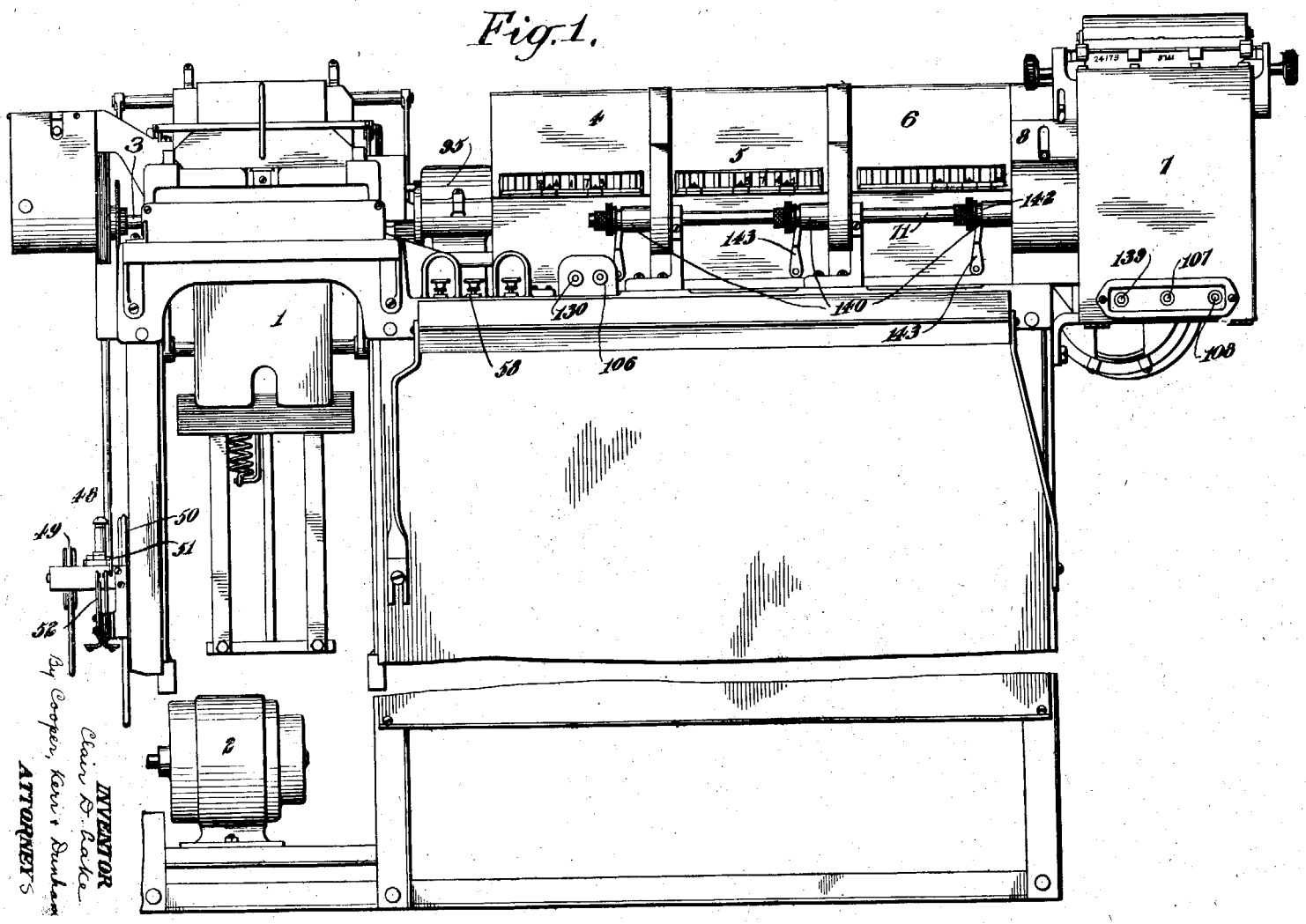
Figure 1 is a front view in elevation of a conventional form of tabulator with my improved attachment associated therewith.

The tabulator proper is well known in the art and requires but little further description than will be given incidentally herein. In Fig. 1 the card-controlling portion 1, the driving motor 2, the counter shaft 3, and the counters 4, 5 and 6 are shown in their normal relations. As is well known, as the perforated cards are passed through the machine, one or more of the counters are operated to show the figures or the totals of the figures represented by the perforations in said cards.

Figure 12:
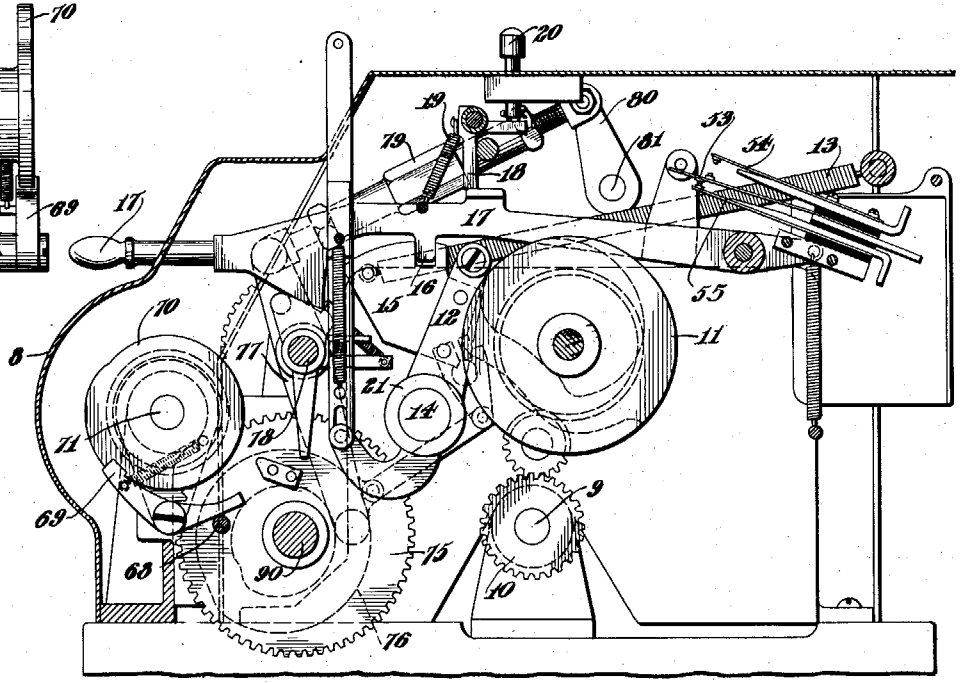
Fig. 12 is a side view of the upper portion of the mechanism in the tabulator taken on line 12—12 of Fig. 14.
Figure 14:
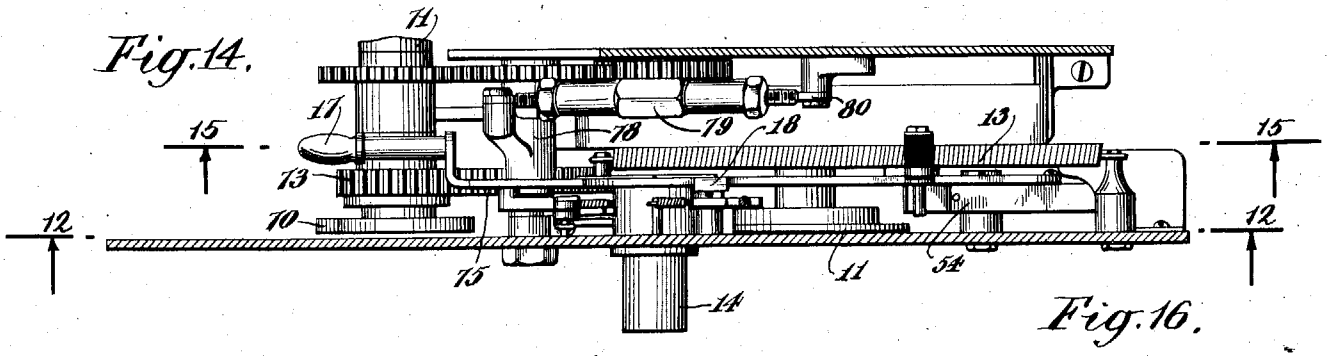
Fig. 14 is a top plan view of the intermediate portion of the tabulator and its printing attachment.
Figure 15:
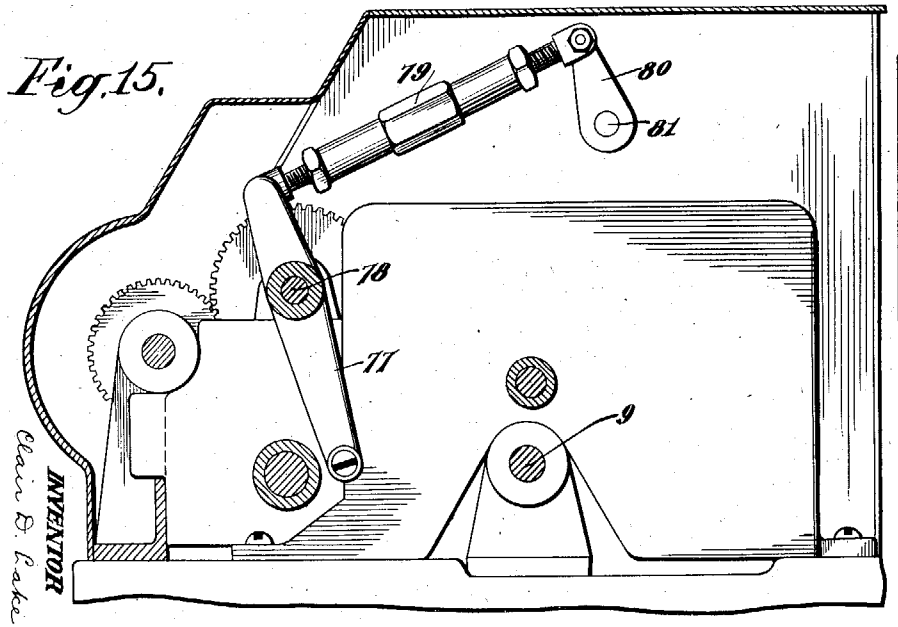
Fig. 15 is a sectional view of the same parts on the line 15—15 of Fig. 14.

My improved printing attachment for such a tabulator is designated by the numeral 7, and between this attachment and the tabulator is a casing 8, a part of the interior mechanism in which I shall now describe by reference to Figs. 12, 14 and 15.

In these figures the shaft 9 is driven by the tabulator motor 2 and carries a gear 10 which imparts rotation to a cam 11 upon the cam surface of which travels a lever 12, with a roller at its end and actuated by a spiral spring 13. The lever 12 oscillates a loose hub 21 on shaft 14 with which hub it is integral or to which it is fixed, and it has attached to it a plate 15 having a notch 16. When the machine stops after any cycle of operation this notch by reason of the fact that the lever acts on the higher point of the cam, is immediately under a projection on a pivoted handle or lever 17, the end of which projects out through a slot in casing 8. When it is not desired to list, this handle is depressed, locking the lever 12 against movement, so that it does not follow the cam 11, and at the same time lever 17 itself is locked down by a bell crank catch 18 actuated by a spring 19 and may not be again raised until a push button 20 is forced down to release the bell crank catch.

Figure 4:
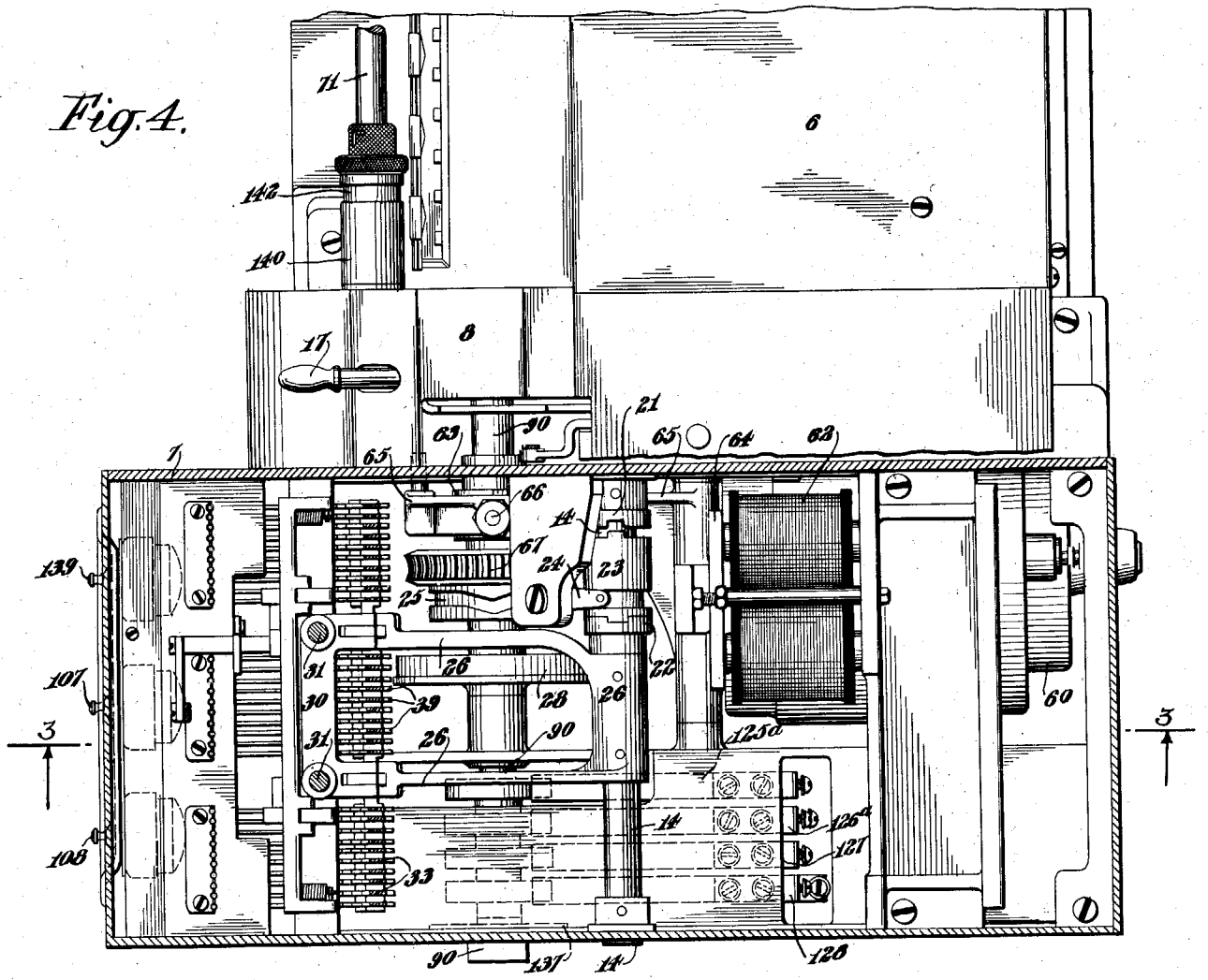
Fig. 4 is a sectional view of the same on the line 4—4 of Fig. 3.
Figure 6:
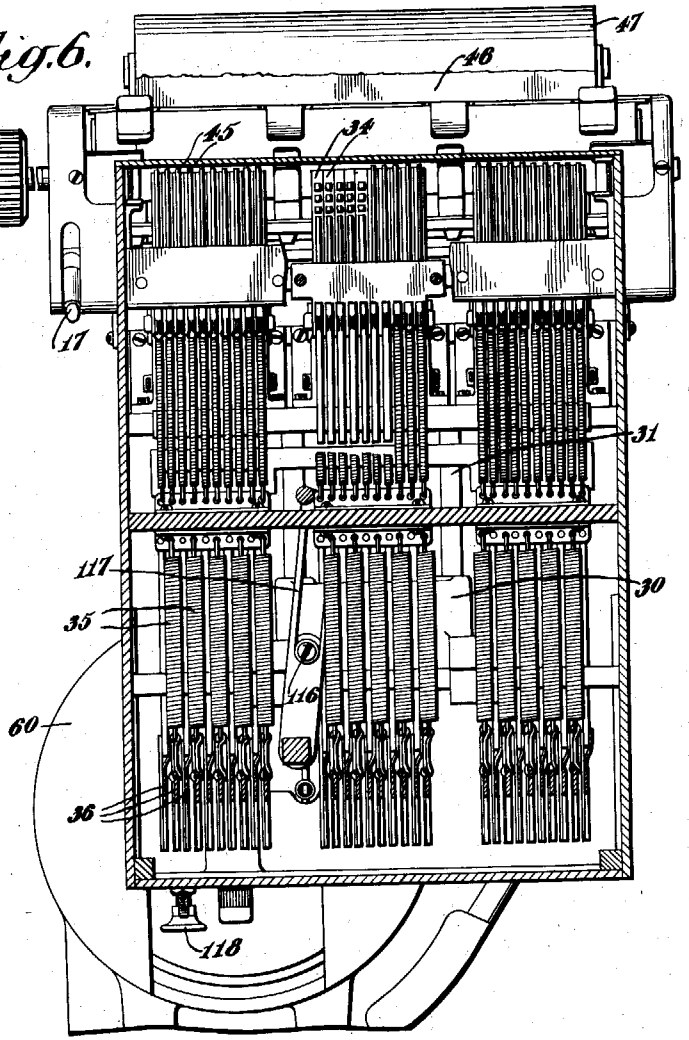
Fig. 6 is a section on the same on line 5—5 of Fig. 3.
Figure 5:
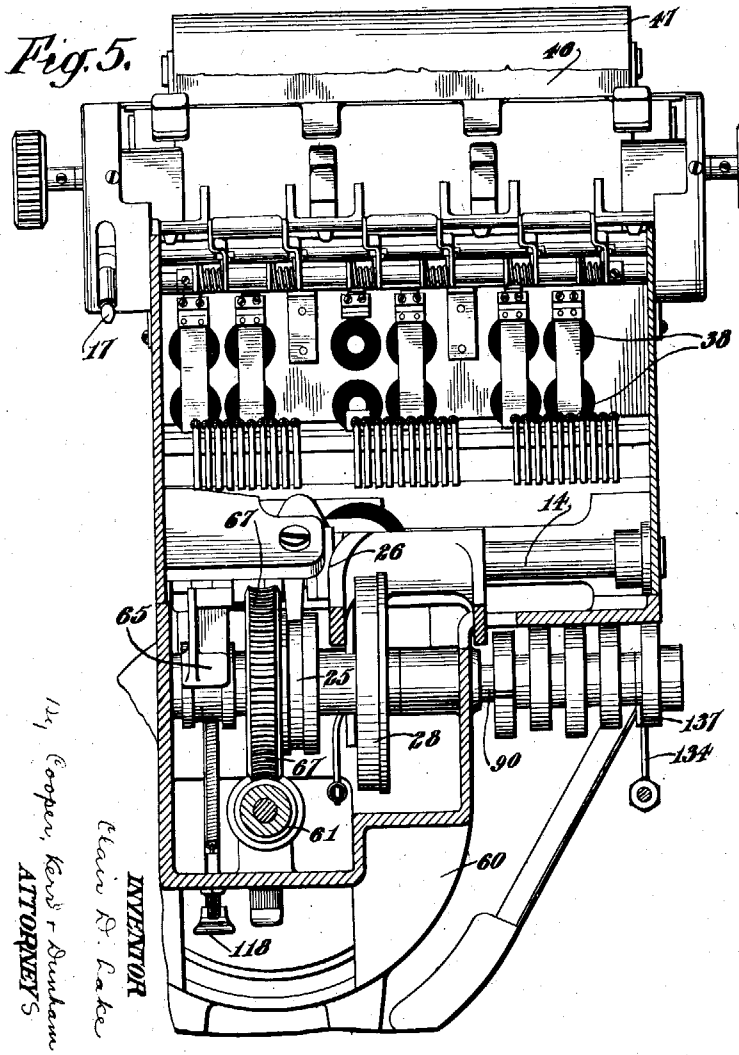
Fig. 5 is a section on line 6—6 of Fig. 3.
Figure 7:
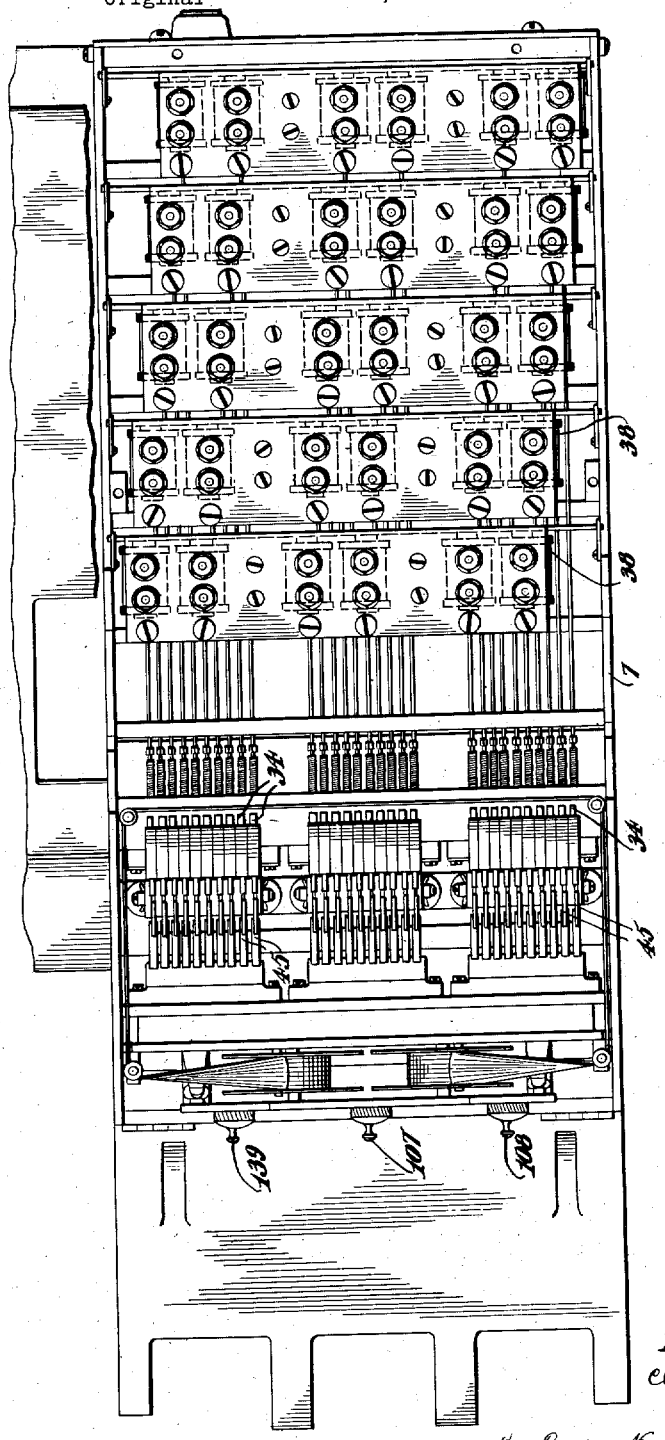
Fig. 7 is a top plan view of the attachment with the paper roll and cover removed.

In the printing casing 7 the shaft 14 extends as shown in Fig. 4 and carries in addition to the hub 21 a second loose hub 22 and both ends 21 and 22 have teeth or notches therein. Intermediate these hubs is a sliding notched sleeve 23 keyed to the shaft and adapted to be moved from engagement with one hub 22 to the other 21, or conversely, by means of a lever 24 oscillated by a cam groove in a disk 25 fixed on shaft 90.

Pinned to the shaft 14 is also a double lever 26 (see Figs. 3, 4 and 8) which partakes of the oscillatory movement of said shaft, and is thus raised or lowered according to whether the keyed sleeve 23 engages with hub 21 to which the lever 12 is secured, or whether it engages with the hub 22, integral with which is a lever or arm 27 which bears upon and is oscillated by a cam 28 fixed on the shaft 90.

The normal position of the sleeve 23 is in engagement with the hub 21, and this must be the case when the machine is used for listing. By means to be hereinafter described, the lever 24 throws the sleeve 23 into engagement with hub 22 when a total is to be printed from which it follows that in listing the shaft 14 is oscillated by the lever 12, but in total printing by lever 27.

Referring now to Fig. 8, the ends of the oscillatory lever 26 are connected by links 29 with a cross head 30 movable over vertical rods 31, and imparts vertical movement thereto. Extending from the cross head 30 are arms carrying a bail 32 which extends through a plurality of slotted bars 33 equal in number to the counter wheels of the tabulator and each carrying a series of ten sliding type 34. Normally the bars 33 are drawn upward by spiral springs 35 connected to them through links and lever 36 and therefore are in contact with the bail 32 and follow the upward movement of the latter imparted by lever 26 until arrested by pawls 37 operated by the magnets 38, and engaging in one of a series of notches 39 in the side edge of the bars 33. The spacing of the notches 39 corresponds with the spacing of the movable type 34 and the movement of the bars under the influence of the levers 26 is synchronous with the movement of the perforated cards through the machine, so that when a perforation is encountered by a brush in the tabulator, the corresponding magnet 38 is energized, as will be hereinafter set forth, and the bar is stopped at a point in its upward travel which brings the type corresponding to such perforation into the printing position and holds it there until after the printing.

The cross head 30 has rearwardly-extending projections 40 with rollers which work in slots in plates or levers 41, pivoted at 42 and as the cross head rises these levers, by reason of the conformation of the slots, are forced back, thereby swinging a bail 43 to the left into engagement with pivoted spring actuated levers 44, forcing the same back and allowing a series of pivoted spring actuated printing levers 45 to swing away from the type carried by the plates or bars 33. At the limit of upward movement of the cross head 30, however, this bail 43 is turned down and slips off from the ends of levers 44 and these being suddenly released are thrown by their springs forward, thus driving the printing levers forward with sufficient force and momentum to strike either a type or the blank point on a type carrier. A type thus struck, strikes the paper 46 on a roller 47 and prints thereon the proper figure.

By the means above described it will be seen that every perforation in a proper card will cause to be set at the printing position and printed on a sheet of a paper a figure corresponding to that perforation, in addition to tabulating the same figures in the usual and ordinary way on the counters. It is necessary, however, when listing or printing in this manner to provide for a slower operation of the machine than for tabulating only; for printing totals and subtotals; for resetting all parts to zero at certain desired times and for performing certain other operations and I shall now describe the means which I have devised for accomplishing these operations.

On the tabulating portion of the machine, see Fig. 1, is a lever or handle 48 which, by its actuation of any well known form of mechanism, imparts to the machine a slower or a faster speed. For example, when shifted to the left this handle throws in a belt operating a small pulley 49 which drives the machine at a relatively high speed and when shifted to the right throws in a belt operating a large pulley 50, which drives the machine at a slower speed. In the present case the slower speed is used when the machine is listing, and the higher speed when tabulating only.

The handle 48 carries an arm 51 which controls in its movement the contacts 52 and on low speed these contacts are brought together. By reference to Fig. 12, it will be seen that when the lever or handle 17 is raised a central contact strip 53 comes into engagement with an upper contact 54, but when the handle is lowered this central contact engages a lower contact 55.

The diagram (Fig. 36) shows the circuits of a well known Hollerith tabulator with certain supplementary circuits and controls which pertain to the printing attachment and its cooperative control with the tabulator.

As customary in this type of machine, the circuit of the tabulating motor 2 is provided with a clutch magnet 104 (Figs. 34–36), an emergency stop key 56 and a manual starting key 57. The usual motor relay 150 is likewise provided. 94 represent the counter brush relays and 94ª the counter magnets. As is customary in tabulators these magnets and relays are adapted to be coupled by plug connections to the contact blocks 93ª and through the controlling cards to the brushes 93. In tabulators having my novel printing attachment these contact blocks may also be connected to the printing or listing magnets 38. 100 is the so-called card lever which is customarily used in machines of this type to interrupt the operation of the tabulator when there are no cards in the machine or when a so-called stop card passes the lever. Such stop cards are usually placed between groups of cards of different group characteristics. For a further description of such stop card, reference may be had to Hollerith Patent No. 1,087,061.

The card lever circuit includes a cam contact device 99, 200—201—204 which will be more fully described hereafter and this contact device cooperating with card lever 100 is arranged to bring into circuit or cut out of circuit relays 151, 152, 153 and 131 at the proper time in the operation of the machine.

The counter circuit to relays 94 and the printing circuit to magnets 38 when listing is arranged to be interrupted at the end of the passage of a card and closed at the intial passage of a new card by cam contacts 97—97ª and 98—98ª which work conjointly for this purpose.

All of the foregoing broad features with the exception of the circuits to the printing magnets 38, are common and well known in the Hollerith machine and reference may be had to Hollerith Patents Nos. 945,236 and 1,087,061, for a fuller understanding of the same. It is sufficient to here state that when the tabulator is in operation, perforated cards are passed successively between a series of brushes 93 connected to a common conducting plate 92 and the contact blocks 93ª which are plugged by plugboard connections into circuits containing counter brush relays 94 and control magnets 94ª (and also the printing and listing magnets 38). Whenever a brush, therefore, comes over a perforation in a card the foregoing counter magnets are operated to perform their allotted fuctions and control the registering and counting operations. In addition the printing magnets 38 are energized and deenergized to control the printing or listing operation as previously described.

Although the usual circuit cycle of a Hollerith tabulator is well known in the art a brief description of the same will make more clear the printer circuit operation which will be described in connection therewith.

To start the tabulator without listing handle 17 is placed in lower non-listing position. The start key 57 is then depressed. Current then flows through the tabulator motor 2, clutch magnet 104, stop key 56 (closed), motor control relay 150, key 57, 53 and lower contacts 55, lower contacts 129 (now closed), to the line. The tabulator then starts in operation and the main motor circuit is held after 57 is opened by relay 150 which establishes a circuit through cam contacts 96ª (now closed), through cam contacts 129 (closed) to the other side of the line.

In the diagram the contacts 96ª are shown open. This is the position they assume at the stop or D car position. As shown in Fig. 29 immediately after starting by the start key or otherwise these contacts become closed by cam 96 on shaft 220 operated by a tabulator drive shaft 3. During tabulating operations this circuit to the tabulator motor is maintained either through contacts 96ª or by the energization of relay 151 which closes a circuit around these contacts. Under running conditions with regular cards this relay will be energized to maintain the circuit when contacts 96ª are open, which occurs once for each card cycle. Relay 151 is controlled in the following manner. At the time of starting the mahine, the first card will close contacts through card lever 100. At the D or starting positions contacts 201 and 204 are closed by tabulator cam 99. Shortly after starting these contacts are broken. Current does not flow through relays 151 and 152 until cam 99 has rotated far enough to close all contacts 201, 200 and 204. This closure energizes relays 151 and 152 and thereafter this circuit is maintained by the holding circuit 205 controlled by relay 152. Further rotation of cam 96 breaks contacts 200 and 204 but contacts 201 and 204 remain closed during the remainder of the card cycle. Relay magnet 151 therefore remains energized and maintains the tabulator motor circuit at the time cam 96 breaks contacts 96ª. It will be understood that on the next card cycle at time contacts 201 and 204 and 200 are broken relay magnets 151 and 152 will be de-energized and the tabulator motor circuit maintained by contacts 96ª.

The tabulating operation continues until after the last card or a stop card having a notched corner passes the card lever 100. At this time, at the beginning of the stop card cycle or during a no card cycle, card lever contacts 100 will be open and consequently upon the breaking of lower contacts 201 and 204 the circuit through relay magnets 151 and 152 will be interrupted and will not be re-established since the re-energization is controlled by the making of the circuit through upper contacts 200 and 204. At the time of reclosure of 200 and 204, the controlling contacts are in a dead circuit controlled by the now opened card lever 100 and therefore they cannot cause a re-energization of the relay magnets 151 and 152. The tabulating machine will, however, complete its cycle until interrupted by breaking of contacts 96ª when it will be brought to a stop at the D position.

If instead of a straight tabulating operation, it be desired to list, handle 17 is placed in upper position thereby interrupting the starting circuit from key 57 by opening contacts 53—55. However a circuit will be made through contacts 53—54 with contacts 52 which it will be remembered are only closed when lever 48 is shifted over to cause the tabulating machine to operate at the lower listing speed. With this circuit thus established the tabulator is started in the same manner as before by start key 57. This control prevents starting and running of the tabulator if the parts are not properly adjusted for listing.

Assuming that the tabulator has been running and has completed an accumulation of items from a group of cards and been stopped by the stop card coming under the card lever; a printing of a total and the resetting of the counters of the tabulator may be affected in several ways. The tabulating machine can come to a stop and total printing may be brought about by a manual operation involving the pressing of the total print or reset key. Or if desired, the parts can be so adjusted that as the tabulator comes to a stop automatically operable means is called into action which sets the total printing and resetting means into operation. The first manually controlled method of taking a total will be now described and hereafter a description will be given of the means for taking the total automatically.

It will be assumed that the tabulating operation is complete and the tabulator stopped in the manner previously explained. To take a printed total the operator depresses reset key 58 which connects reset motor 60 in a circuit traced as follows: from source 59, through reset key 58, contacts 100ª—102 now closed, contacts 103 now closed, reset clutch control magnet 62, motor 60, and back to source.

Contacts 103 are used to prevent the starting of total taking or resetting during a tabulating operation. These contacts are controlled by magnet 104 which is energized at all times when the tabulator is in operation and which magnet only permits the closure of these contacts when current is not flowing through the tabulator circuit. In addition to this control effective operation of the reset key during tabulating operations is prevented by a tabulator driven cam 101 which keeps contacts 100ª and 102 open except at the end of the tabulator cycle, thereby preventing the taking of a total until the tabulator has finished tabulating items from a run of cards.

After starting, the reset key may be released since control of the circuit to the clutch magnet 62 and to the total printing and resetting motor 60 is taken over by cam contact devices 125—125ª and 126—126ª which are actuated by a shaft 90 in the printing attachment (see Fig. 4). These contacts 125ª—126ª also control the making and breaking of the circuits 221 to the various printing magnets 38 in total taking operations. The control of these contacts over these circuits is such as to only supply current to the circuits when a printed total is to be taken. Circuits 221 extend to contacts 85 and a detailed explanation of the taking of a printed total by these contact devices will be given hereafter.

Figure 3:
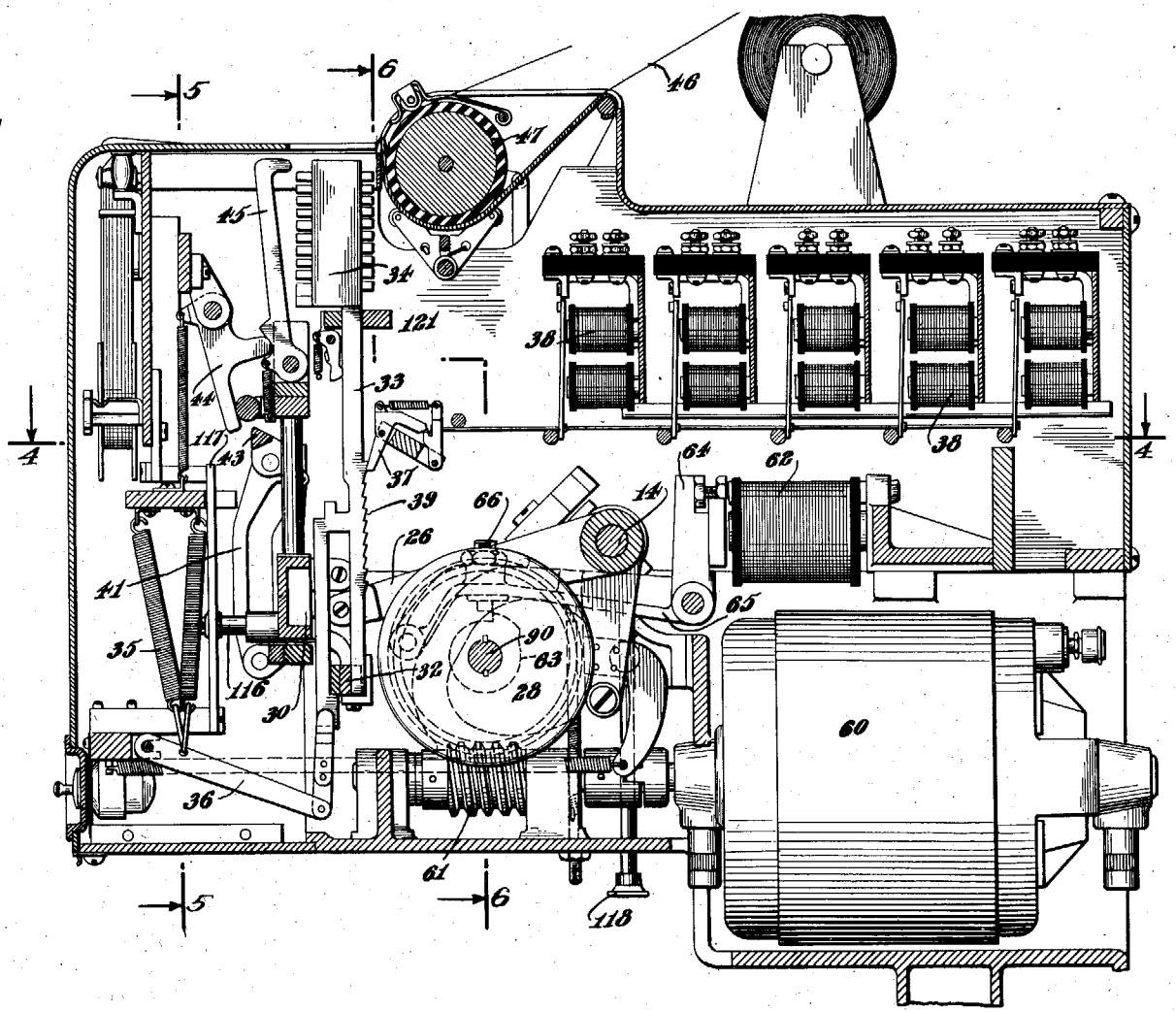
Fig. 3 is a sectional view of the attachment taken on the line 3—3 of Fig. 4.

The reset motor by its rotation is adapted to first effect the printing of a total or totals and thereafter it may reset one or more of the tabulator counters to zero if the parts are adjusted for resetting. Referring to Fig. 3, the shaft of motor 60 carries a worm wheel 61 that imparts rotation to a gear wheel 67 loose upon shaft 90. The closure of the reset motor circuit by key 58, or by the automatic means to be hereafter described, energizes an electromagnet 62 which releases a clutch 63 on the shaft 90 by the movement of its armature 64, rigid with an arm 65 that raises a pin 66 out of a circumferential groove in the clutch and permits the said clutch which is keyed to shaft 90 to engage under spring action with the wheel 67.

Figure 2:
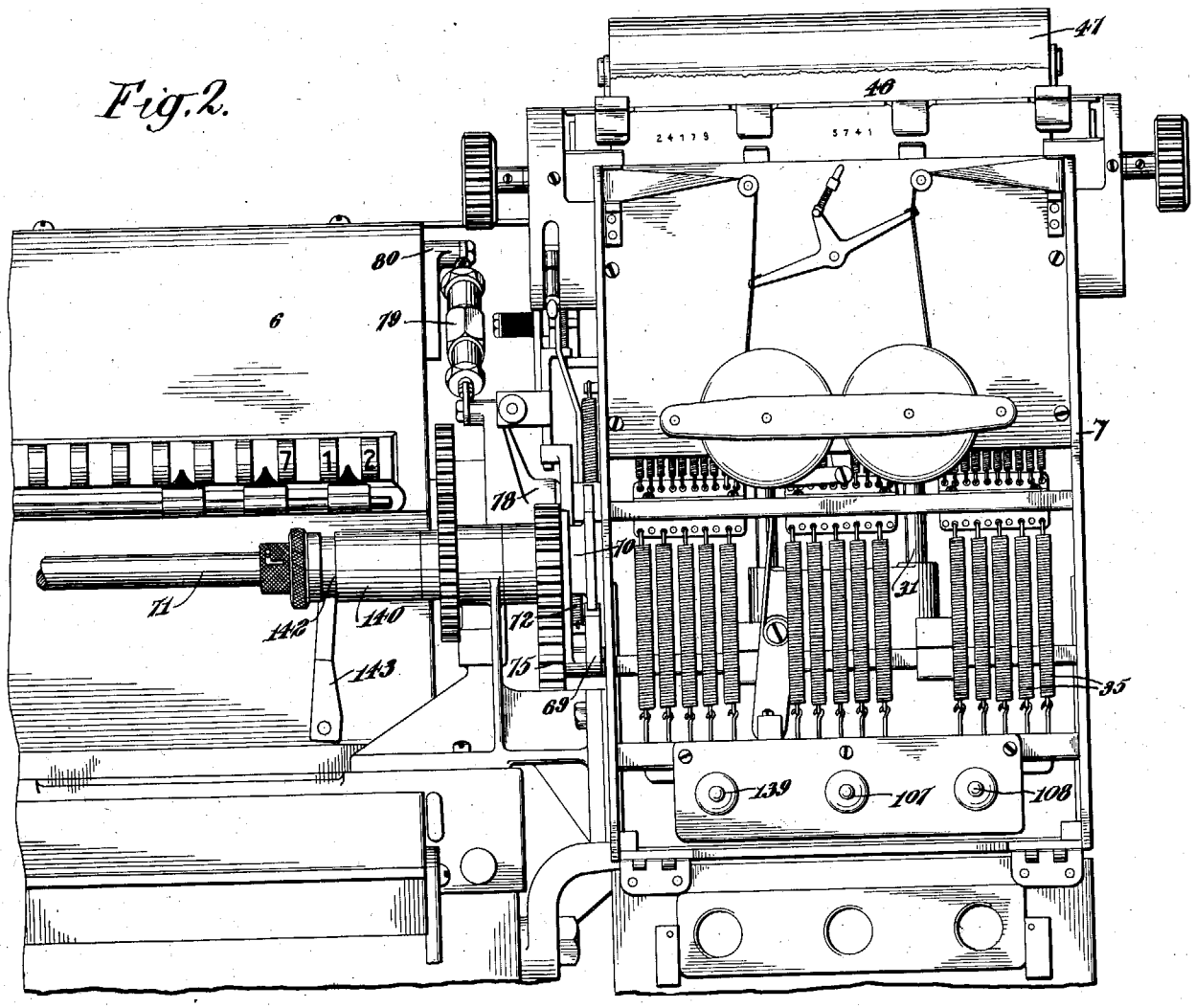
Fig. 2 is an enlarged view in elevation of the printing attachment showing a part of the tabulator. The cover of the attachment is removed to exhibit the general internal arrangement.
Figure 36:
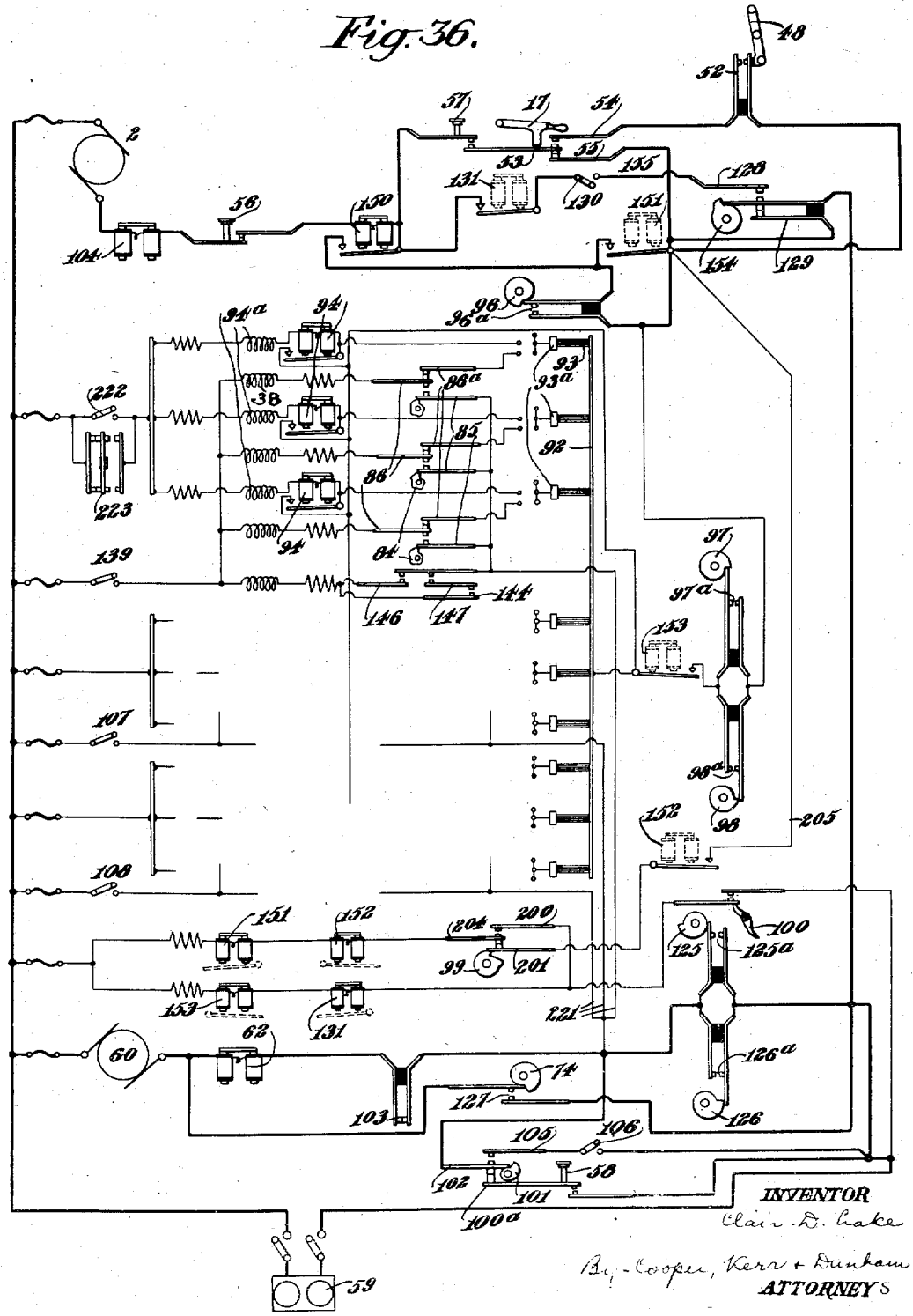
Fig. 36 is a diagram of the circuit connections and an illustration of the relations of the several parts of the apparatus.

The said arm 65 carries also a pin 68, see Figs. 4 and 12, and on its upward movement causes said pin 68 to engage with pawl 69 engaging with a notch in a cam 70 on a shaft 71 (see also Fig. 2). The pawl 69 is carried by an arm or plate 72 which is fixed to a gear wheel 73 (Fig. 13) loose on shaft 71, and in gear with the shaft 90 through a gear wheel 75 (Fig. 12), but as the pawl is thus disengaged from the cam 70 the latter is not revolved by the first revolution of the pawl 69 and gear 73. The magnet 62, however, as shown diagrammatically in Fig. 36, is short circuited by a properly timed cam 74 with cooperating contacts 127 so that the control of the reset motor is taken away from cam contact devices 125, 125ª, 126, 126ª. During the time the cam 74 has closed contacts 127 current flow to magnet 62 is prevented but current is allowed to continue to flow to motor 60 as will be understood from the diagram. When magnet 62 is short circuited, a pin 68 drops out of the path of the pawl 69 during the first revolution of gear 73, which pawl is thereby permitted to re-engage with the cam 70 and to rotate the same during and by the second rotation of the gear wheel 73. By the above described arrangement the gear 75, makes one revolution while the gear 73 makes two. The purpose of this may be thus explained.

During the first half revolution of the gear wheel 75, the lever 27 operates to raise the type carrier and print a total or totals, but during this period the gear wheel 73 is rotating, whereas cam 70, pinned to the shaft 71, is stationary. During the second half of the revolution of wheel 75, however, while resetting the type carrier, the gear 73 rotates and picking up the cam 70 imparts its rotation to the shaft 71 which operates in the usual way to reset such tabulator counters as are selected for resetting to zero. Resetting devices for tabulators are shown in Hollerith Patent 1,030,304, dated June 25, 1912.

Fixed to the gear wheel 75 is a cam 76 best shown in dotted lines in Fig. 12, and upon this cam bears an arm or lever 77 pivoted at 78, see Fig. 15. The lever 77 is connected by a turn buckle 79 with an arm 80 fixed to a shaft 81, which extends back through the tabulator counters, where over each set of indicating wheels 82, Figs. 17 and 18, it carries a bail 83 fast to it, and associated, as will be set forth, with contacts corresponding to each indicating wheel.

Figure 20:
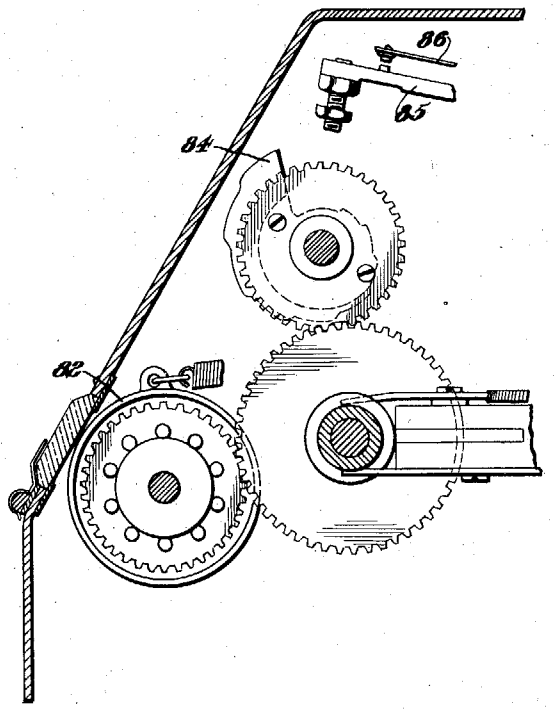
Fig. 20 is a section on the line 20—20 of Fig. 19.
Figure 19:
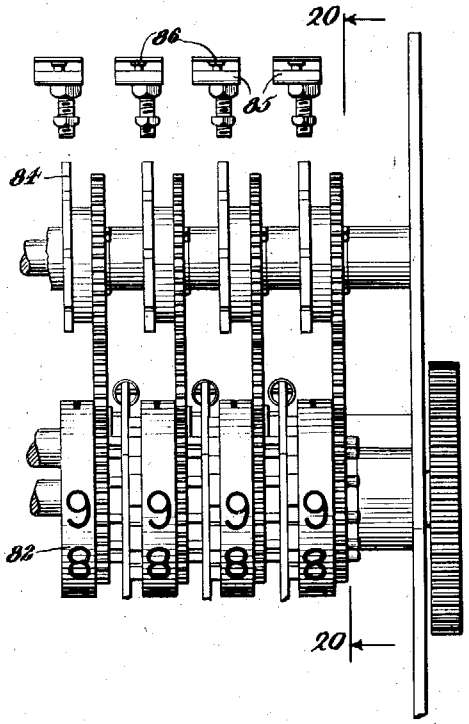
Fig. 19 is a detailed front view of the tabulator counter wheels and controlling mechanism for the total printing devices.

In gear with the indicating wheels and moving in exact unison therewith are cam disks 84 (Fig. 20) with ten steps of varying height corresponding to the numbers on the wheels; that is to say, the highest step corresponding to 9 and the lowest to zero. By each rotation of the cam 76 the shaft 81 is rocked and the bail 83 is depressed, and this results in the following operation.

A set of contacts 85, 86 are associated and mounted with suitable insulation on a support 87 turning loosely on shaft 81, and by a spiral spring 88 the lower contact 85 is held against a shoulder on an insulating post 89 on bail 83, while the upper contact 86 is held out of contact with 85 by the top of this post which projects up through the lower contact. When the bail 83 is lowered an insulating stop on each contact 85 comes in contact with that step on the disk 84 under it, which on the stoppage of the machine is presented to that position, so that the bail still descending draws the post 89 away from the upper contact and allows this to come into engagement with the contact under it.

It will be borne in mind that when the conditions now being described are established by the depression of the key 58, or by the closure of contact 105—102, the last figure or figures in the column in the listing machine have been printed and the type-carriers restored to their initial or normal positions. But, while such type bars or carriers, after the operation of key 58, are not raised again by the movement of lever 12, they are raised in the same way by the lever 27 and move in a synchronism with the bail 83 and its associated parts. Hence, when this bail is depressed and the circuit controlling contacts 85 and 86 brought into operation, these contacts will close at points in the cycle of operation dependent upon the height of the steps on disks 84 which they encounter, or in other words, the value of the digits which these steps represent.

The contacts 85, 86 control the circuits of the magnets 38 when printing totals, and hence these magnets will arrest the type carriers at points in which the type thereon corresponding to the steps are brought into the printing position. It will be seen that in this machine there is one set of type for each column of figures which are used for both listing and total printing. These type are arranged in vertical rows with the 9 at the top of the carrier. This is so that the type will correspond with the numbers when listing, as the 9 is the first number which on a perforated card comes under the tabulator contact brush when the cards are fed through the machine. In taking a total the step cam disks 84 have the highest points to represent 9 so that when the contact device is locked down on these disks, the first point of contact would of course, be the highest point, representing 9.

Figure 17:
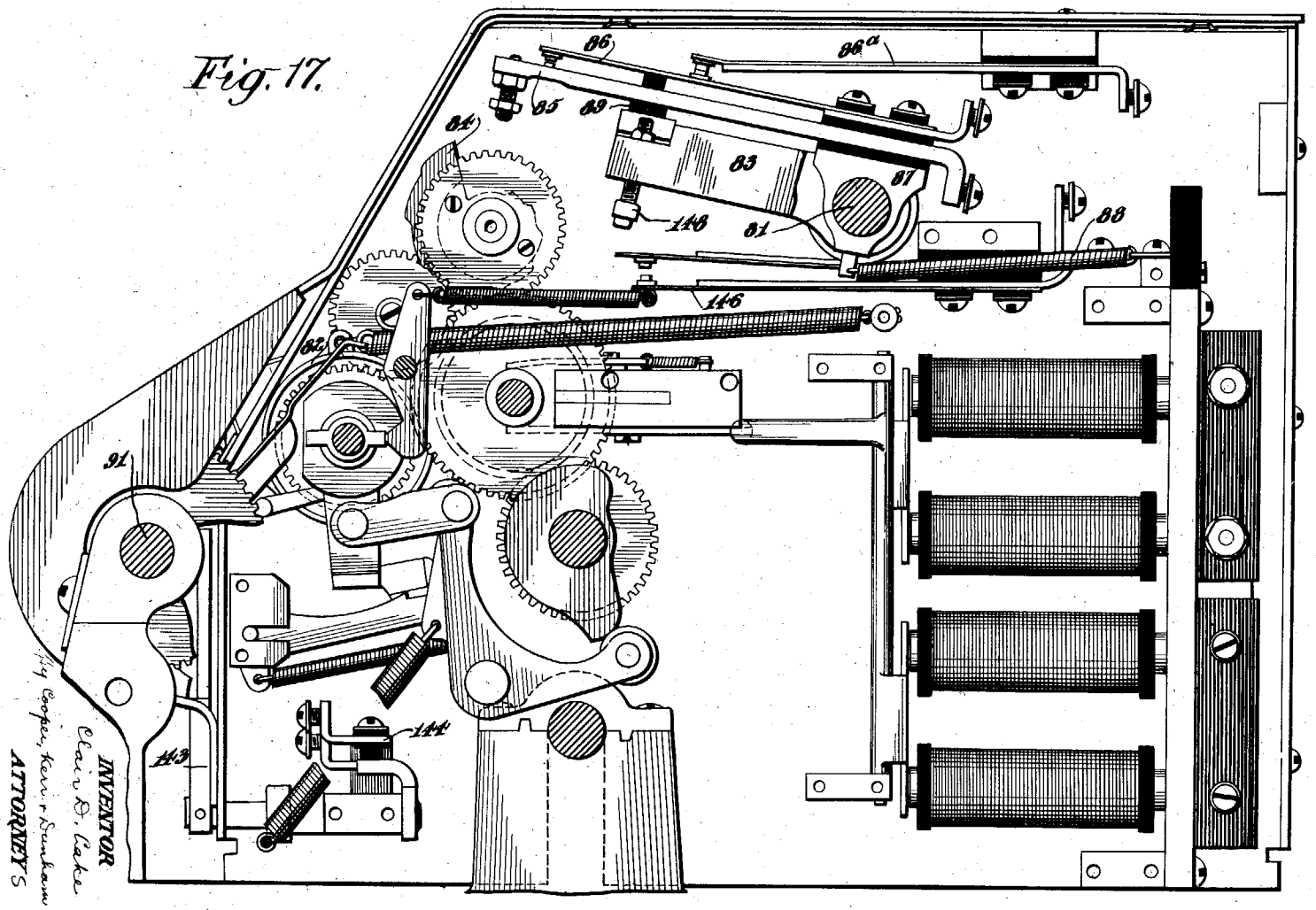
Fig. 17 is a vertical section through one of the counters of the tabulator.
Figure 18:
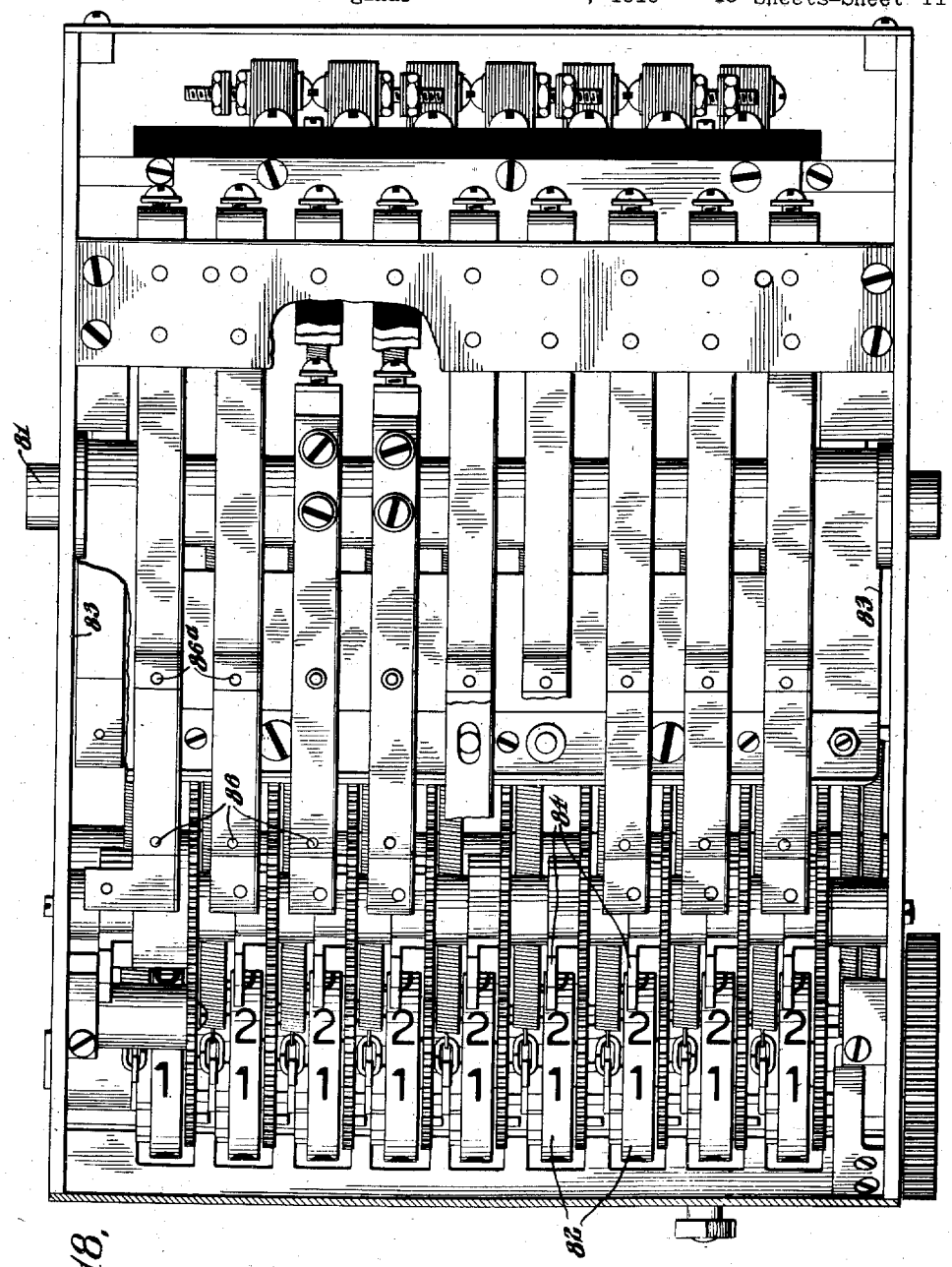
Fig. 18 is a top plan view of the indicating wheels of the tabulator and the contacts which control the printing mechanism.

Referring to Fig. 17 and the diagram, Fig. 33, above contacts 86 are supplementary contacts 86ᵃ which with contacts 86 establish the circuits between the printing magnets 38 and the plugboard sockets when the machine is to be used for listing. Upon taking of the total, these circuits to the plugboard are interrupted by opening of contacts 86—86ᵃ which is brought about by downward rocking of bail 83 at this time. In this way, back flow of current through the plugboard and brushes and counter magnets is prevented during total taking operations.

The method of automatically taking a printed total and resetting the tabulator counters will now be described. It will be assumed that a group of cards has passed through the tabulator and that the items are accumulated upon the counters and the tabulator stopped at the end of the card group by the stop card, the card lever 100, cam contact 99 and 96 in the manner previously described. If automatic total printing and resetting is desired, the manual autoprint and reset switch 106 is first closed. Then, as the tabulator comes to a stop, cam 101 which is disposed upon a shaft 220 of the tabulator (see Fig. 33) closes contacts 105, 102. The closure of these contacts establishes the circuit to the total printing and resetting motor 60 and initiates the printing and reset cycle which is now completed in the manner explained for a manual taking of the total.

Under certain conditions, it is desirable that tabulating be automatically recommenced at the termination of the printing and reset cycle provided there are cards in the machine available for further tabulating operations. For example it may be assumed that a group of cards of a predetermined group has passed through the machine, the items tabulated, the operation interrupted, and a total taken either manually or automatically. Then if there are cards of a different group available for further tabulating it may be desirable to automatically recommence tabulating upon the second group. In connection with such an operation, it is also desirable to prevent tabulating during total printing or resetting operations, otherwise a confused and improper tabulation or accumulation would be performed.

To secure such control, cam contact devices 128—129—154 are provided. Cam 154 is disposed upon a shaft 90 in the printing attachment and at the end of the printing cycle effects a closure of upper contacts 128 and thereby initiates a new tabulator cycle provided the manual autostart switch 130 be closed and relay magnet 131 be energized. As previously explained, relay magnet 131 is in circuit with the card lever 100, and this circuit will be interrupted when there are no cards in the machine. Therefore the tabulator cannot be restarted if the cards are exhausted. If, on the other hand, the tabulator has been stopped by a stop card the interruption of the circuit to relay 131 is only temporary, since the notch in the stop card will have passed the card lever 100 permitting the reclosure of the circuit to relay magnet 131. If this circuit is closed the tabulator motor circuit can be closed through relay 150, relay 131, switch 130 and cam contact devices 128 upon the rotation of cam 154. After the tabulating operation is thus initiated, control of the tabulator motor circuit is taken over by magnet 151, cam contact devices 96, 96ª and 99, the stop card lever 100 in the manner previously explained so that the tabulating will continue until the passage of the next stop card or after the passage of the last card beyond card lever 100.

Cam contact devices 154—129 serve to prevent tabulating during the printing and resetting operations by opening lower contacts 129 and maintaining said contacts open until the printing and resetting operation is complete (see Fig. 26). When such contacts are open, the operation of the start key 57 is ineffective to initiate a tabulating operation.

The relay magnet 153 in the card lever circuit serves to control the circuits to the brushes and counter magnets and prevents adding or listing when there are no cards in the machine.

In the foregoing reference has been made particularly to the diagram Fig. 36. The various cam contact devices described as being driven by the tabulator shaft 220 are shown in Figs. 29 to 33 inclusive. These comprise cam contacts 96ª, 97, 97ª, 98, 98ª, 101, 102, 105 and 100ª, 99, 200, 204 and 201. These cams and contact devices are located in a box 95, Figs. 1—27—28 and the driving cams are all mounted upon a shaft 220 which is geared to rotate in unison with the tabulator driving shafting.

Figure 21:
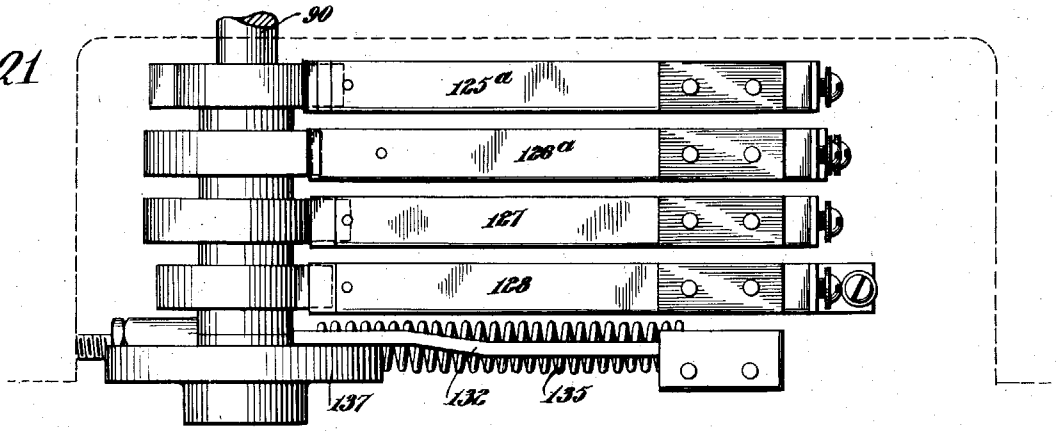
Fig. 21 is a plan view of cams and contacts in the printing attachment, the contacts being those controlling during the printing and resetting portion of the cycle.

Cam contacts 125, 125ª, 126, 126ª, 74—127, 154—128—129, are all actuated by a shaft 90 in the printing attachment. These contact devices are actuated whenever shaft 90 is connected up to and rotated by motor 60. The cam contact assembly which is driven by the printer is best shown in Fig. 21, see also Fig. 5. The individual cam and contact devices are shown separately in Figs. 23 to 26 inclusive.

There are three switches 139, 107 and 108, shown in Figs. 1 and 36, which control the three printers of the counters 4, 5 and 6 respectively. If these switches are opened the circuits to the corresponding ten printing magnets 38 of each set which control the stopping of the type bars or carriers, are broken, and the type carriers will all travel to present a blank point in the printing position so that no figures will be printed.

Figure 34:
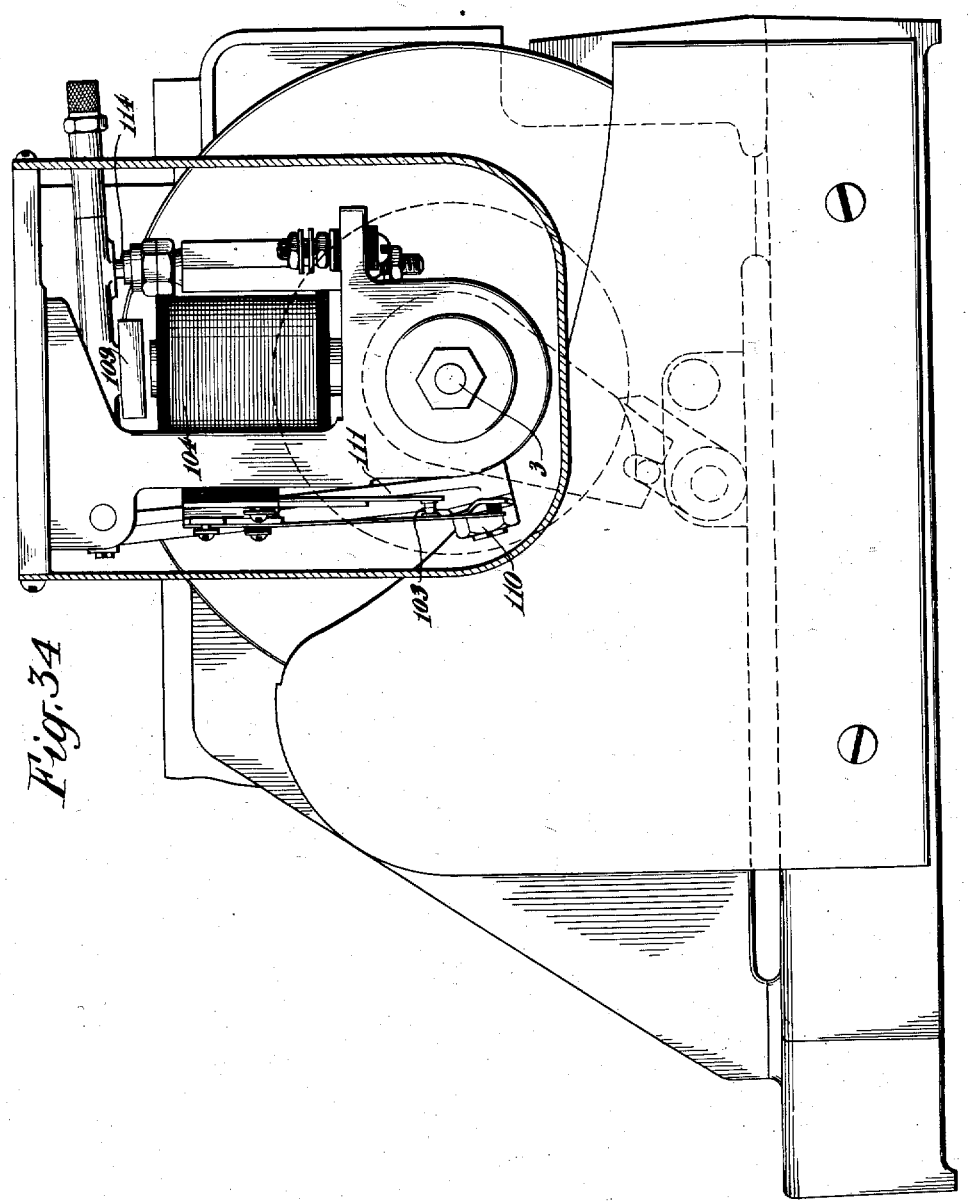
Fig. 34 is an end view of the tabulator clutch mechanism.
Figure 35:
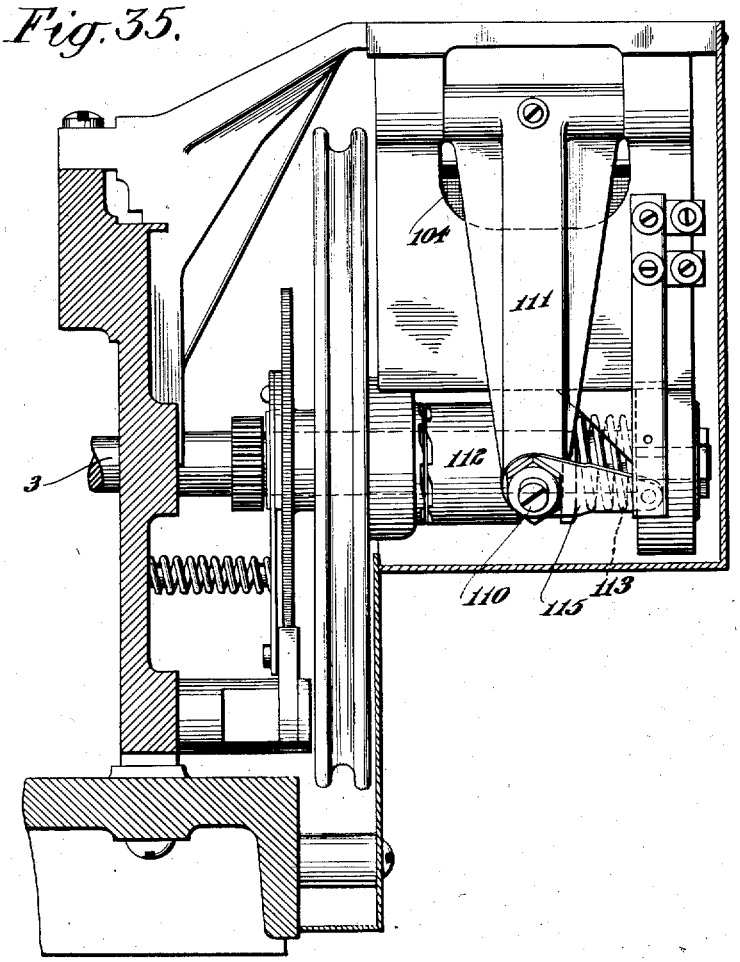
Fig. 35 is a side view of the same.

In Figs. 34 and 35 the details of the clutch control magnet 104 which controls the starting and stopping of the tabulator are shown. The circuit of this magnet is controlled primarily, either manually by the tabulator start key 57, or automatically by the cam contact devices 154—128, and when this magnet is thus energized it attracts its armature 109, thereby disengaging a pin 110 mounted on lever 111 rigid therewith, from the sliding clutch member 112 impelled by spring 113 and this member when so released is forced into engagement with the tabulator shaft thereby starting the tabulator. The armature 109 remains in attracted position as long as the tabulator is running and until the cam contacts 96, 96ª break the circuit after the passage of the last card or stop card, when the magnet 104 releases the said armature which is then forced away from the magnet cores by means of a spring plunger 114. As the pin 110 engages in a slot in the clutch member 112 a properly tapered portion of this slot throws out the clutch when engaged by the pin 110. Contacts 103 are broken while magnet 104 is energized, this being effected by an arm 115, carried by the lever 111.

Figure 16:
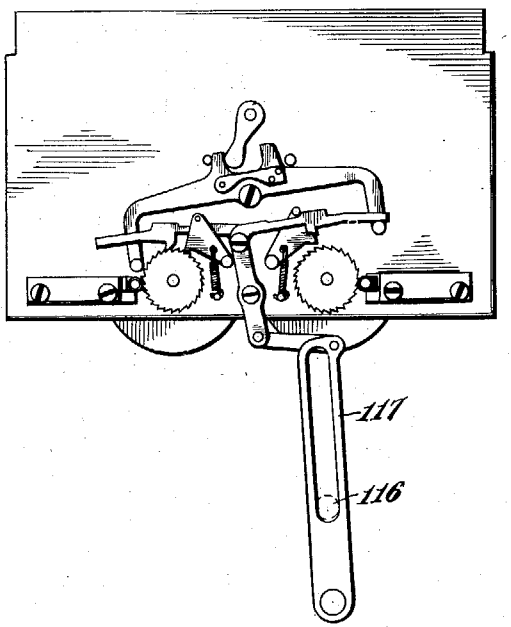
Fig. 16 is a detail of the ribbon feeding mechanism for printing from the type.

In Fig. 16 is shown the inking ribbon feed, the construction of which may be any known in the art, and which is not described herein in detail as it forms no part of the present invention. This ribbon feed is operated by a pin 116, extending from the crosshead 30, see Fig. 3, and engaging in a slot in a pivoted bar or plate 117. As the crosshead rises and falls this engagement imparts a sufficient sidewise movement to the bar 117 to feed the ribbon one step.

In Fig. 3 a push button 118 is shown which when hand-operated releases a clutch member 63 in the printing mechanism whenever it may be desired to operate the machine by hand.

In Figs. 3, 8 and 8ª a zero control device 120 is shown. There is one of these levers for each type carrier and each is pivoted at 121. Each lever has an arm 122 projecting over the next lever to the left of the group of nine levers. If the lower ends of lever 120 drop into a recess or slot 123 in the bars 33 these bars will rise to a point where a blank space is presented to the printing position, but should the levers 120 be held out so that the ends do not pass into the recesses 123 but are stopped by a projection 124, then the type carriers will be raised to a point where they present zero type at the printing position. From the construction shown and described it is manifest that all type carriers to the left of those thus raised to print zero will present blank spaces at the printing position, so that no zeros will be printed at the left of a total or listed item.

Figure 22:
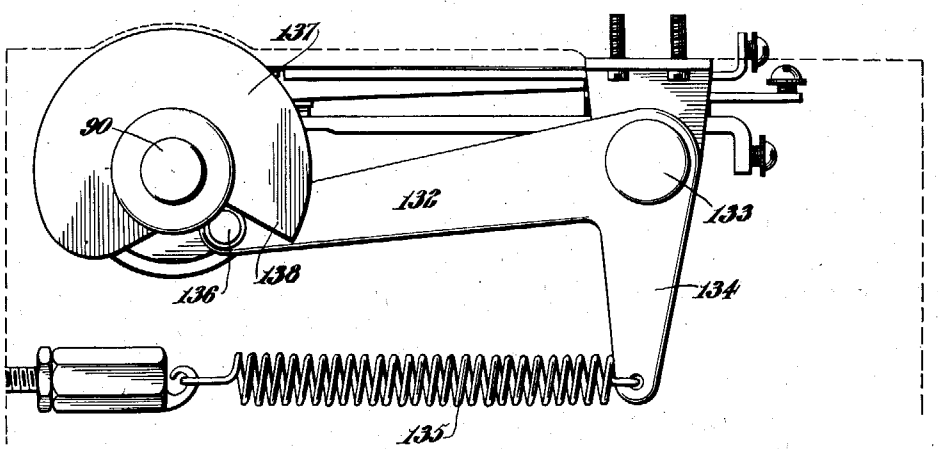
Fig. 22 is a side view of the same parts.
Figures 27, 28:
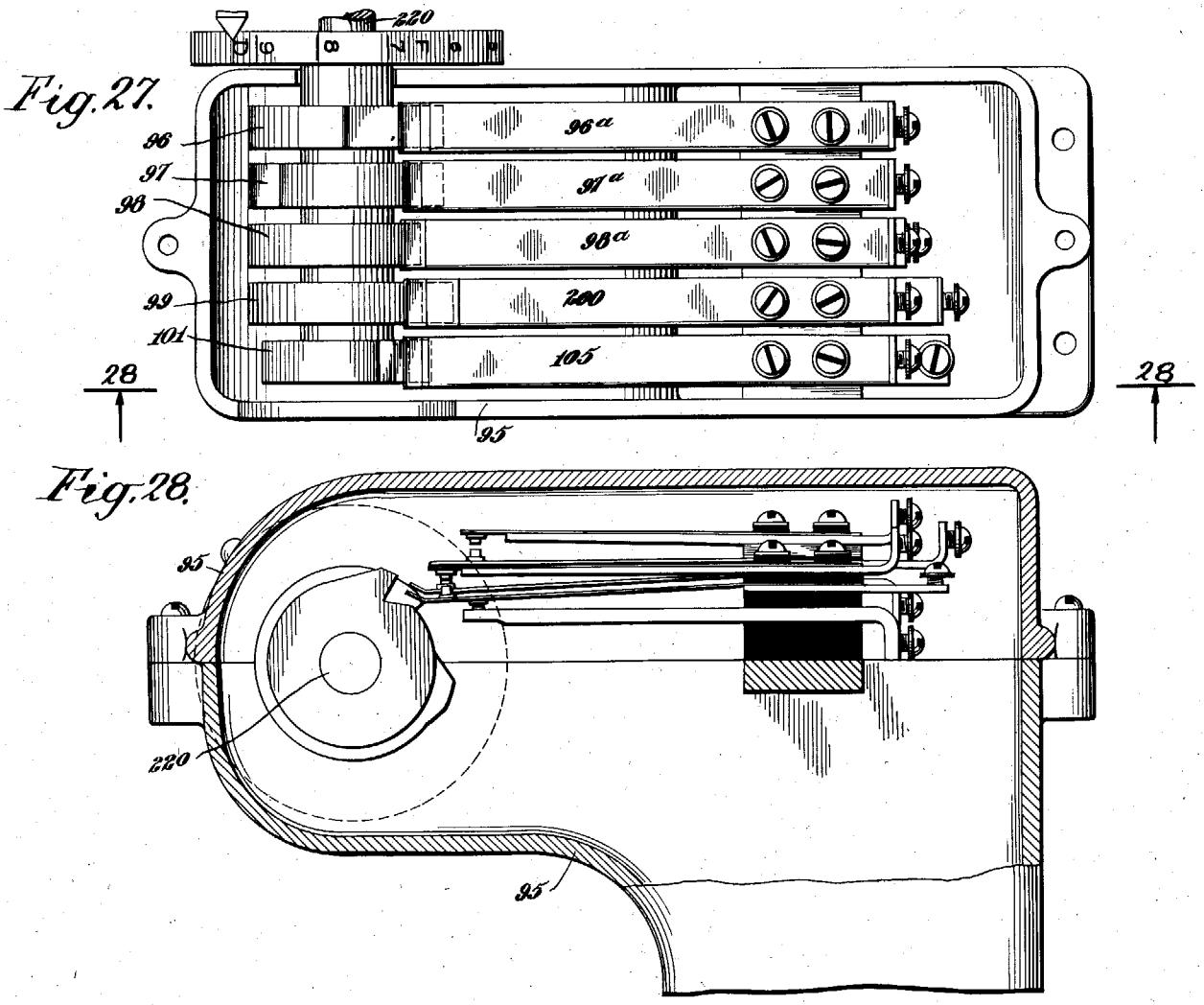
Fig. 27 is a plan view of a cam box and contacts operated by the tabulator.
Fig. 28 is a sectional view on the line 28—28 of Fig. 27.

In Figs. 21 and 22 there is shown a cam mechanism which is used for boosting the shaft 90 forward to complete the cycle, and thus overcome the additional load thrown on that shaft at the end of each cycle. This mechanism comprises a lever 132 pivoted at 133 and having a right-angled arm 134 to which is connected a stout spiral spring 135. The lever 132 carries a roller 136, which travels over the high part of a cam 137 on the shaft 90, and by this means the spring is held under tension. Near the end of the cycle the roller drops into a depression over the inclined surface 138 and the force of the spring is exerted against this inclined surface with a tendency to push the cam and shaft in the direction of its normal movement.

Figure 13:
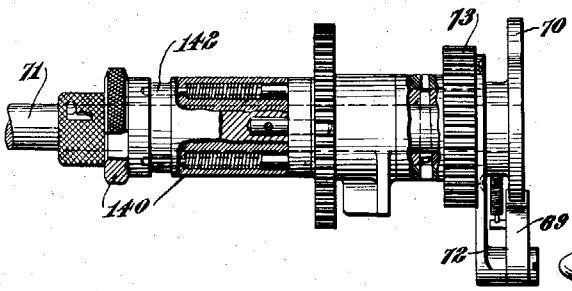
Fig. 13 is a detail view partly in section of a part of the tabulator mechanism.

The tabulator, as will be seen from Figs. 1 and 13, is provided with hand-operated milled sleeves 140 on the shaft 71, for throwing in the clutch members 141 that operate to throw into operative condition the means for resetting of the tabulator counters. The sleeves 140 are of any ordinary construction and contain indentations into which pins or clutch members 141 pass when the sleeves are forced forward, and when they are thus set or forced in the corresponding counter will reset to zero. On the milled sleeves 140 are grooves 142 into which project the ends of pivoted levers 143, see Figs. 1 and 2, so that as the sleeve is moved in or out of engagement this lever operates the contacts 144 as shown in Fig. 17. One of the type carriers 33, which in Fig. 9 is marked 145, has but two type, an asterisk, and the letter S, and this carrier is controlled in its upward movement by the same means as the other type carriers.

When contacts 144 therefore are broken the carrier 145 is permitted to rise until the asterisk is brought to the printing position and is printed together with the total. This indicates that when the total was taken, that tabulator counter was reset to zero.

On the other hand, if the clutch member 141 is out, the lever 143 is in a position to close contacts 144 and if a total be taken with these contacts closed and the clutch out, the counters are not reset, and the type carrier 145 is stopped to present the S to the printing position, which will indicate that the total is a subtotal and that the counters were not reset. The S type carrier is controlled by magnets similar to 38 and the circuits to these are closed at the proper time by contacts 144, 146 and 147 as will be presently described.

In addition to the contacts 144 for controlling the printing of the asterisk and the S there are two contacts 146 and 147 shown in Fig. 36 though but one appears in Fig. 17 as the other is on the other side of the counter. When a total is taken by the depression of the bail 83 an insulated screw 148 brings contacts 146 first together and a similar screw brings contacts 147 later together. If contacts 144 happen to be closed by the clutch member 141 being out, then the type carriers are stopped at the position to print S, but if contacts 144 are opened and switch member 141 in, when contacts 146 close, the S is passed and when later, contacts 147 are closed the carrier is stopped to print an asterisk.

By the use of the subtotal device herein described I may obtain so-called accumulated subtotals. If the counter is not reset, each successive subtotal will show not only the items of a particularly listed group, but will also include the amounts of the subtotals previously printed. This result is desirable where it is desired to show the subtotal on the bottom of one record sheet and to carry the same amount and repeat the printing on the top of the next sheet. Thereafter further amounts may be accumulated and other accumulated subtotals taken. Furthermore by resetting the counter or counters after the taking of each subtotal, true non-accumulated individual subtotals can be secured. It is also possible to print a grand total in a separate column representing the total of the various subtotals in a different column.

It is to be understood that the printing of totals or subtotals may be effected after a listing of a run of cards or after straight tabulating operations when no listing is being carried out. It is only necessary to shift the listing lever 17 and speed change lever 48 to the proper position to selectively control whether the machine is to list and tabulate or to tabulate without listing. Total or subtotal printing may be carried out and controlled in either case in the manner heretofore described.

In the diagram Fig. 36 I have shown separate wires from the plugboard to the counter magnets and to the printing or listing magnets and also a plurality of plug sockets connected to the individual contact blocks 93ᵃ. This arrangement permits the counters alone, or the printer or listing magnets alone, or a combination of both printing listing and counter magnets to be connected up to the card controlled brushes. Thus by a selection of proper plug connections I am enabled to carry out on one machine straight tabulating without either printing or listing, straight printing or listing without tabulating or combined tabulating and printing and listing.

By the use of the plugboard in the manner heretofore used in nonprinting and nonlisting tabulators, I am enabled also to list upon one column of the record sheet and take subtotals in said column. The amounts thus listed in one column may likewise be tabulated on a separate column which is not connected up for item listing. Then at the end of a run of cards I can however take a grand total from this separate counter and print the result in a corresponding separate column upon the record sheet. In this manner listing and subtotaling operations can be printed in one column and grand totals taken and printed in another. The number of separate columns to be tabulated or listed and the numbers of counters and printed sections to be utilized may be varied widely by the proper use of the plug connections between the contact blocks 93ª which are connected to the brushes and the counter relays and the printing magnets.

Referring again to the diagram Fig. 36, the switch 222 when closed cuts out the group indicator 223 and when open brings this group indicator into operation. The group indicator is fully described in Hollerith Patent 1,087,061. The purpose of this device is to cut out registrations on a counter after the first card of any group has passed the brushes. In this way, group designating numerals are set up upon the counter. By using this device in connection with my printing attachment, I am able not only to visually indicate the group numbers but also to print them upon the record sheet. For straight tabulating when it is desired to accumulate items on the group indicator counter with or without listing them, switch 222 is closed but in group indicating and group printing operations when this particular counter is used to set up the group designating character of the first card, it is open.

By utilizing the group indicator device in connection with the printing attachment I am able to print the group number along with the printed totals when the machine is not set for listing. Or I may list and repeat the printing of the group number for each item when listing items. In this operation the adding plugs to the group indicator counter are disconnected and the listing plugs only are connected, and therefore group printing is not effected during total-taking. Also, by disconnecting the listing plugs and connecting the adding plugs to the group indicator counter I may set up the group number therein when the first card passes the brushes and when a total is printed this group number will be printed. In this case no group numbers will be printed alongside the listed items.

There are other mechanical parts and details used in the apparatus above described which require no specific description that will tend to convey a more complete understanding of the main invention, or which are present in other machines of this general class and are well known. In the above description attention has been paid to the more or less specific construction of the purely mechanical elements and reliance has been had on the diagram, Fig. 36, for the electrical devices as the functions of these and not their specific construction are of the essence of the invention.

The tabulating art has reached a well known stage of development where with the information herein contained any skilled worker in this art will be able to add to such a machine the novel features of this invention—a listing and printing attachment—so coordinated with the tabulating mechanism that it may be utilized at the will of the operator to list the figures set up on the counters by the perforated cards, to take subtotals and totals and to reset the tabulator counters. No machine so far as I am aware, has heretofore been produced that will effect these operations in the manner herein set forth.

What I claim as my invention is—

1. The combination with a tabulating machine of a printing or listing attachment, intermediate mechanism for connecting it with or disconnecting it from the tabulator mechanism and means for causing the tabulator to run at reduced speed under the control of the means which connect the listing attachment with said tabulator.

2. The combination with a power driven tabulating machine of a printing or listing attachment, intermediate mechanism for connecting the same with or disconnecting it from the tabulator mechanism, and means for applying the driving power to the tabulator at varying rates, operatively controlled by said intermediate mechanism whereby the machine will be run at a reduced speed when the printing and listing attachment is connected with the tabulator mechanism.

3. The combination with a tabulating machine of a printing or listing attachment, intermediate mechanism for connecting the same with or disconnecting it from the tabulator mechanism, and means controlled by the listing attachment to prevent the tabulator from operating while said attachment is in operation for the printing or listing.

4. The combination with a tabulating machine of a printing or listing attachment, intermediate mechanism for connecting the same with or disconnecting it from the tabulator mechanism, and means for resetting the tabulator counter wheels to zero operated by and during the operation of the total printing means in said listing attachment.

5. The combination with a tabulating machine of a printing or listing attachment, intermediate mechanism for connecting the same with the tabulator mechanism or disconnecting it therefrom, and mechanism in said attachment controlled by the tabulator counter wheels, and adapted to operate independently of the listing means for printing the totals indicated by the adjusted position of the tabulator counter wheels.

6. The combination with a tabulating machine of a printing or listing attachment, means for connecting it when desired with the tabulator mechanism whereby it lists the figures perforated in the tabulating cards, means in said attachment cooperating with the tabulator mechanism for printing the totals displayed by the counters, means controlled by the total printing mechanism for resetting the tabulator counters to zero, and means for indicating when such resetting mechanism has been brought into operation and when not.

7. The combination with a tabulating machine of a printing or listing attachment and means for bringing the same into operative relation with the tabulator mechanism, and circuit controlling means in both the tabulator and the listing mechanism for automatically and cooperatively controlling the operations of both mechanisms.

8. The combination with a tabulating machine of a printing or listing attachment and means for operatively connecting the same with the tabulator mechanism, movable type carriers in the said attachment operated in unison with the tabulator mechanism, and electromagnets operated by the tabulator contact brushes for stopping at the printing position the type in such carriers that represent the perforations in the tabulator cards through which such brushes make contact.

9. The combination with a tabulating machine of a printing or listing attachment and means for operatively connecting the same with the tabulator mechanism, means for controlling the speed of the tabulator and interconnecting circuits between the tabulator and its attachment and circuit controllers therefor which prevent the tabulator from being operated at its normal or high speed when the listing attachment is connected therewith.

10. The combination with a tabulating machine of a printing or listing attachment and means for operatively connecting the same when so desired with the tabulator mechanism, means for controlling the speed of the tabulator, interconnecting circuits between the tabulator and its attachment and circuit controllers, both manual and automatic, therefor which prevent the tabulator from being operated at its normal or high speed while the listing attachment is connected therewith.

11. The combination with a tabulating machine having sets of counter wheels, of a printing or listing attachment having corresponding sets of printing devices, means for operatively connecting said attachment with the tabulator mechanism, and means for connecting up the resetting mechanisms for the tabulator counters with the total printing mechanism of the attachment.

12. The combination with a tabulating machine and a printing or listing attachment adapted to be brought into operative relation therewith, of motors in both the tabulator and in the attachment, means for connecting the tabulator and listing mechanisms and means for bringing the motor in the attachment into operation for printing totals and for resetting the tabulator counters to zero.

13. The combination with a tabulating machine of an attachment therefor comprising means for listing the figures perforated in the tabulating cards at each cycle of operation of the tabulator while adding on the tabulator counters, and means for printing the total displayed at any time by such counters, contacts operated by said printing means and operating upon cams on the tabulator counter wheels to control the operation of the total printing mechanism.

14. The combination with a tabulating machine of a printing or listing attachment comprising mechanism for listing figures corresponding to those added at or by each cycle of the operation of the tabulator, and independent means for printing the totals displayed at any time by the tabulator counter wheels, means normally connecting the listing mechanism with the tabulator mechanism and total printing controlling means adapted on its operation to disconnect said mechanisms.

15. In a card-controlled tabulating machine, in combination, automatic registering mechanism controlled by record cards, total-taking mechanism, selective devices having provisions for determining whether the operation of the total-taking mechanism shall be initiated manually or automatically, and selecting devices having provisions for determining whether the resumption of registering operation after a total-taking operation will be initiated automatically or manually.

16. The invention set forth in claim 15 in which means is provided for selectively controlling whether the registering devices are to be reset after a total-taking operation or allowed to continue accumulating without resetting.

17. In a card-controlled tabulating machine, in combination, automatic registering mechanism controlled by record cards, total-taking mechanism therefor, and selective devices having provisions for selectively predetermining whether the registering mechanism will be reset after a total-taking operation or permitted to continue accumulating without resetting.

18. In a card-controlled tabulating machine, in combination, automatic registering mechanism controlled by record cards, total-taking mechanism therefor, and selective devices having provisions for selectively determining whether the registering devices will be reset automatically after a total-taking operation or whether the resetting will be initiated by a manual operation.

19. In a machine of the class described, in combination, card-controlled registering tabulating devices, total-taking mechanism therefor, means for operating the same, and circuit control means for determining whether the operation of the total-taking mechanism shall be automatically or manually initiated.

20. In a machine of the class described, in combination, a tabulating machine, a printing attachment having type carriers provided with type for printing totals, means for suppressing the operation of said type carriers during tabulating operations, means in the tabulating machine for interrupting the tabulating operation upon the completion of the tabulating of a group of cards, automatically operable means in the said tabulating machine for bringing the printing attachment into cooperative relation with the tabulator to effect total printing of the tabulated items, and automatically operable means for thereafter restarting the tabulating operation upon the succeeding card group.

21. The invention set forth in claim 20 in which means is provided for automatically resetting the tabulator to zero upon the completion of taking of a printed total.

22. In a machine of the class described, in combination, a tabulating machine, a printing attachment, card-controlled means in the tabulating machine for automatically interrupting the tabulating operations, means operable automatically upon such interruption of tabulating for effecting total printing by the printing attachment of the items tabulated without restarting the tabulator, and manually operable means for restarting the tabulator in the tabulating operation upon additional cards.

23. The invention set forth in claim 22 in which means is provided for automatically resetting the tabulator to zero after printing is completed and prior to the restarting of the tabulator.

24. The invention set forth in claim 22 in which manually controlled means is provided for initiating the resetting of the tabulator to zero upon the completion of the total printing operation.

25. In a machine of the class described, in combination, a tabulating machine, a printing attachment, means for preventing the operation of said attachment during tabulating operations, card-controlled means for interrupting the tabulating operation, manually operable means for bringing the printing attachment into cooperative relation with the tabulator to effect total printing of card data accumulated thereby, and automatically operable means for restarting tabulating after the total printing operation.

26. The invention set forth in claim 25 in which means is provided for automatically resetting the tabulator to zero after the total printing is completed and prior to the restarting of the tabulator.

27. In a machine of the class described, in combination, a tabulating machine, a printing attachment therefor, card-controlled means for interrupting the tabulating operation upon predetermined conditions, manually operable means for bringing the printing attachment into cooperative relation with the tabulator to effect total printing of the card data accumulated thereby, and independent manually operable means for thereafter restarting the tabulator in its tabulating operation upon a succeeding set of cards.

28. The invention set forth in claim 27 in which means is provided for resetting the tabulator to zero upon the completion of the printing operation.

29. In a machine of the class described, in combination, a tabulating machine, a printing attachment therefor, means for bringing the attachment into cooperative relation with the tabulating machine to print a total of the numbers set up therein, and means operable by the tabulator for preventing the operation of the printing attachment when the machine is tabulating cards.

30. In a machine of the class described, in combination, a tabulating machine, a printing attachment therefor, means for bringing the attachment into cooperative relation with the tabulating machine to effect total printing of the desired items in the tabulator, and means operable by said printing attachment for preventing the operation of the tabulator when such total printing is being effected.

31. The invention set forth in claim 30 in which means is provided for preventing effective operation of the total printing attachment to print totals when the tabulating machine is operating successively upon cards.

32. In a card controlled tabulating machine, in combination, automatic registering mechanism controlled by record cards, total-taking mechanism therefor, said mechanism having devices coacting with the registering mechanism to take a total therefrom prior to the resetting of said registering mechanism, and means including a device brought into operation automatically by the operation of the tabulating machine for resetting the registering mechanism after a total is taken therefrom by the aforesaid total-taking mechanism and devices.

33. In a perforated card controlled mechanism, in combination, electrically controlled tabulating means for accumulating items from record cards, means for taking printed records of subtotals of said items, and means for taking a printed grand total of all of said subtotals.

34. In a perforated card controlled mechanism, in combination, electrically controlled tabulating means, for accumulating items from cards upon registering devices, means for taking a printed record of a total of items accumulated, means for thereafter resetting the registering devices to zero, and means for thereafter accumulating a second total and taking a printed record thereof.

35. In a card controlled mechanism, a tabulator adapted to accumulate items from record cards, a printing attachment for printing totals having provisions for suppressing the listing of items making up said totals, and means controlled by said tabulating machine for printing the designating group numbers with said totals.

36. In a card controlled mechanism including in combination, a tabulator adapted to accumulate items from records cards, a printing attachment for listing items and printing totals of a plurality of items accumulated upon said tabulator, means for printing non-accumulated group indicating numbers correlated with the first listed item of a group and with the printed total of that group, and means for suppressing the printing of such group indicating numbers with the intermediate items which are printed after the first item printing and until a total of the group is printed, said item printing means being controlled by the tabulator and in accordance with the group numbers of cards which are tabulated thereby.

37. In a card controlled mechanism, in combination, a tabulator for accumulating certain items from the cards and visually indicating the group designating characteristics thereof, and a printing attachment for listing the successive items accumulated from the cards by said tabulator and for also printing the non-accumulated group designating characteristics of the passing cards.

38. In a card controlled mechanism, in combination, an electrically controlled tabulator for accumulating certain items from the cards, means controlled by said tabulator for imprinting upon a record sheet totals of items accumulated by said tabulator and concurrently imprinting group numbers of non-accumulated items.

39. In a card controlled mechanism, in combination, an electrically controlled tabulator provided with brush contact devices adapted to accumulate items from record cards, a printing attachment with provisions for listing the items of the accumulation and for printing the total thereof, and means in said attachment for printing with each item a group designating number and for suppressing the printing of said group number in printing a total.

40. In a card controlled accounting machine, in combination, a tabulating device for accumulating items from cards, a printing attachment, means therein for listing successive items from said cards upon one column of a record sheet, means for concurrently accumulating the items thus listed and for printing a total of the accumulated items upon a separate record sheet column without listing the individual items thereon.

41. In a card controlled machine of the class described, in combination, a tabulating machine provided with registering devices adapted to be read visually for accumulating items from said cards, a printing attachment for printing totals of items accumulated, and means for suppressing the printing of totals when it is desired to visually read the said tabulator registering devices.

42. In a card controlled apparatus, in combination with registering mechanism for accumulating items from record cards, a printing mechanism, means for controlling the printing mechanism for listing individual items directly from the perforated record cards and independently of the registering mechanism, and means for controlling the printing mechanism from the registering mechanism when totals are to be printed.

43. In a card controlled tabulating machine, in combination, automatic registering mechanism controlled by record cards, total-taking mechanism adapted to take off amounts from said registering mechanism by means operable when said registering mechanism is at rest with a total set up thereon and automatically operable means for bringing said total-taking mechanism into operation.

44. In a card controlled accounting machine, in combination with a tabulating machine having printing devices, means in the tabulating machine for accumulating items from record cards, means for printing the individual items in one column upon a record sheet, means for printing subtotals of groups of said items in the same column of said sheet, and means for printing upon another column of said sheet grand totals of a plurality of said subtotal amounts, said last-mentioned means being adapted to suppress the printing of both the individual items and the subtotals and to solely printing grand totals upon the other record sheet column.

45. In a perforated record card controlled apparatus, tabulating devices for accumulating one or more items from record cards, printing devices, and means for adjusting the said apparatus to perform tabulating operations without printing or listing, or to perform printing or listing without tabulating or to perform combined tabulating and printing and listing.

46. A combined tabulator and printer having accumulators to receive items from perforated records, said tabulator having provisions for performing straight tabulating without printing or listing, said tabulator having provisions for performing printing or listing operations without tabulating.

47. In a tabulating machine, means for reading perforated record cards, means controlled by said other means for printing upon a single sheet a plurality of successive items derived from such cards, means for printing a total of such items, and means for printing the totals of such items and suppressing printing of such items.

48. In a machine adapted to be controlled by perforated records, a registering device for accumulating totals of items from the perforated records, a recording device, means for operating the recording device to print a record of the amount accumulated upon said registering device, said means including take-off devices for taking off a reading from the registering device while the latter is at rest and prior to the resetting thereof.

49. In a perforated record controlled apparatus in combination, a registering device for accumulating items, a printing device, means for controlling the same independently of the registering device and directly by the perforated records to print individual items, and means controlled by the registering device for controlling the operation of the printing device for printing amounts standing on the register.

50. In a perforated record controlled apparatus, means for accumulating items from records, adjustable means for printing such items and the totals thereof on a record sheet in various groupings, and means for printing group designations with said items and totals in various relations thereto.

51. In an accounting apparatus, a set of type carriers, means for displacing said type carriers, an accumulator, means for electrically sensing the accumulator, and magnet devices controlled by said sensing means for controlling the differential displacement of the type carriers to thereby present the type corresponding to the amounts sensed from the accumulator to the printing line.

52. In an accounting machine having an accumulator, printing devices, means for operating the same, electrical means for sensing the accumulator, means for concurrently positioning the printing devices and operating the sensing devices and means controlled by the electrical sensing devices for selecting the printing devices which are to effect printing whereby the amount standing upon the accumulator and sensed by the electrical sensing devices is printed.

53. In a card controlled tabulating machine, in combination, automatic registering mechanism controlled by record cards, total-taking mechanism therefor, said mechanism having devices coacting with the registering mechanism to take a total therefrom prior to the resetting of said registering mechanism, and means including a single reset controlling element for initiating the resetting of the entire registering mechanism after a total is taken by said total-taking mechanism.

In testimony whereof I affix my signature.

CLAIR DENNISON LAKE.